US012811140B2

(12) United States Patent
Xiong et al.

(10) Patent No.: US 12,811,140 B2
(45) Date of Patent: Nov. 24, 2026

(54) ELECTROCHEMICALLY-INDUCED AMORPHOUS TO ROCK SALT PHASE TRANSITIONS IN NIOBIUM OXIDE ELECTRODE FOR LITHIUM-ION BATTERIES

(71) Applicant: BOISE STATE UNIVERSITY, Boise, ID (US)

(72) Inventors: Hui Xiong, Boise, ID (US); Pete Barnes, Boise, ID (US); Shye Ping Ong, Menlo Park, CA (US); Yunxing Zuo, San Diego, CA (US)

(73) Assignee: BOISE STATE UNIVERSITY, Boise, ID (US)

(*) Notice: Subject to any disclaimer, the term of this patent is extended or adjusted under 35 U.S.C. 154(b) by 1143 days.

(21) Appl. No.: 17/663,487

(22) Filed: May 16, 2022

(65) Prior Publication Data

US 2022/0367865 A1 Nov. 17, 2022

Related U.S. Application Data

(60) Provisional application No. 63/189,574, filed on May 17, 2021.

(51) Int. Cl.

| | |
|---|---|
| ***H01M 4/485*** | (2010.01) |
| ***C01G 33/00*** | (2006.01) |
| ***C25D 11/26*** | (2006.01) |
| ***H01M 10/0525*** | (2010.01) |

(52) U.S. Cl.

CPC ............ *H01M 4/485* (2013.01); *C01G 33/00* (2013.01); *C25D 11/26* (2013.01); *H01M 10/0525* (2013.01)

(58) Field of Classification Search

CPC ....... H01M 4/485; C01G 33/00; C25D 11/26; C01P 2002/72; C01P 2002/76; C01P 2002/77; C01P 2002/82; C01P 2002/85; C01P 2004/04; C01P 2006/40

See application file for complete search history.

(56) References Cited

PUBLICATIONS

Hwang, S.; et al., Investigation of Changes in the Surface Structure of LixNi0.8Co0. 15Al0.05O2 Cathode Materials Induced by the Initial Change, Chem. Mater., 2014, 26, 1084-1092. (Year: 2014).*

Liu, H.; et al., A disordered rock salt anode for fast-charging lithium-ion batteries, Nature, 2020, 585, 63-81 (Year: 2020).*

Pralong, V.; et al., Electrochemical Synthesis of a Lithium-Rich Rock-Salt-Type Oxide Li5W2O7 with Reversible Deintercalation Properties, Inorg. Chem., 2014, 53, 522-527 (Year: 2014).*

Pete Barnes et al; Electrochemically induced amorphous-to-rock-salt phase transformation in niobium oxide electrode for Li-ion batteries; https://doi.org/10.1038/s41563-022-01242-0 May 2, 2022.

* cited by examiner

*Primary Examiner* — Christina A Johnson

(74) *Attorney, Agent, or Firm* — Parsons, Behle & Latimer

(57) ABSTRACT

Systems and methods are disclosed for a rock-salt structure formed from an electrochemically-driven amorphous-to-crystalline (a-to-c) transformation of nanostructured $Nb_2O_5$, the rock-salt structure including, upon cycling with lithium ions (Li+), an insertion of lithium ions (Li+) into $Nb_2O_5$ to form the rock-salt structure (RS—$Nb_2O_5$).

5 Claims, 21 Drawing Sheets

ELECTROCHEMICALLY-INDUCED AMORPHOUS TO ROCK SALT PHASE TRANSITIONS IN NIOBIUM OXIDE ELECTRODE FOR LITHIUM-ION BATTERIES

CROSS-REFERENCE TO RELATED APPLICATIONS

This application, under 35 U.S.C. § 119, claims the benefit of U.S. Provisional Patent Application Ser. No. 63/189,574 filed on May 17, 2021, and entitled "Electrochemically-Induced Amorphous To Rock Salt Phase Transformation In Niobium Oxide Electrode For Li-Ion Batteries," the contents of which are hereby incorporated by reference herein.

GOVERNMENT LICENSE RIGHTS

The disclosed inventions were made with government support under contract No. DMR-1454984, awarded by the National Science Foundation. The government has certain rights in the inventions.

FIELD OF THE DISCLOSURE

This disclosure relates generally to inducing crystallization of amorphous nanomaterials through electrochemical cycling. More particularly, this disclosure relates to systems and methods for creating unconventional high-performance metal oxide electrode materials for lithium-ion batteries.

BACKGROUND

Increasing global energy demand has intensified the pursuit of high-performance, cost-effective, and sustainable energy storage technologies. While rechargeable lithium-ion batteries (LIBs) are the current market leader, innovative battery materials created with novel processing techniques are needed to reach new performance benchmarks. Niobium oxides are promising negative electrode materials for rechargeable LIBs due to their rich redox chemistry ($Nb^{5+}$ to $Nb^{1+}$), chemical stability, and numerous meta-stable and stable polymorphs. The higher intercalation potential of $Nb_2O_5$ (~1.7 V vs. $Li/Li^+$) relative to commercial graphite electrodes (<0.3 V) makes it less susceptible to Li plating and electrolyte decomposition, and therefore, safer. However, sluggish $Li^+$ diffusion, poor electrical conductivity (~3x10-6 S $cm^{-1}$), and low capacity have hindered the deployment of $Nb_2O_5$ electrodes. To address these issues, work has focused on increasing charge storage and transport properties by developing nanoarchitectures, and/or adding conductive materials (e.g., graphene and carbon-coatings).

Another strategy to improve the performance of $Nb_2O_5$ electrodes is to optimize the crystal structure for lithium-ion intercalation. There are at least 12 different polymorphs of $Nb_2O_5$. Polymorphs of $Nb_2O_5$ previously studied as LIB negative electrodes include pseudohexagonal (TT-$Nb_2O_5$), orthorhombic (T-$Nb_2O_5$), and monoclinic (B, M, and H—$Nb_2O_5$). The average capacity of the most studied T-$Nb_2O_5$ electrodes is around 170 mAh $g^{-1}$, while a higher capacity of 227 mAh $g^{-1}$ has been reported for a monoclinic structure, which is beyond the theoretical capacity of 202 mAh $g^{-1}$ based on $Li_2Nb_2O_5$, i.e., one electron redox per Nb.

Currently, strategies for the synthesis of new intercalation metal oxide electrode materials include traditional ceramic processing by solid-state reactions, hydro (solvo) thermal processing, and ionothermal processing. However, metastable structures with unique properties cannot be easily obtained through such approaches.

This phenomenon exists in transition metal oxide negative electrodes with titanium dioxide nanotubes ($TiO_2NT$), wherein amorphous $TiO_2NT$ undergoes spontaneous phase transformation into a long-range ordered/short-range disordered cubic structure when cycled with $Li^+$. Furthermore, in a manganese oxide system a tunnel-structured todorokite, which is common in nature but difficult to synthesize in the laboratory at room temperature, can be obtained through repeated electrochemical cycling from a layered $MnO_2$.

Other drawbacks, inefficiencies, inconveniences, and issues also exist with current systems and methods.

SUMMARY

Accordingly, the disclosed embodiments address the above, and other, drawbacks, inefficiencies, inconveniences, and issues that exist with current systems and methods.

Disclosed embodiments include an electrochemically-driven amorphous-to-crystalline (a-to-c) transformation of nanostructured $Nb_2O_5$ upon cycling with $Li^+$, and demonstrate the insertion of three lithium into $Nb_2O_5$ (~1.5 electron redox per Nb). Amorphous $Nb_2O_5$ (a-$Nb_2O_5$) transformed spontaneously to a rock-salt structure (RS—$Nb_2O_5$) when the electrode was cycled to a potential of 0.5 V vs. $Li/Li^+$, as identified by transmission electron microscopy (TEM) and synchrotron X-ray diffraction (sXRD). Density functional theory (DFT) calculations revealed that RS—$Nb_2O_5$ exhibits exceptionally high capacity for $Li^+$ ions and low migration barriers for $Li^+$ diffusion. Results from X-ray photoelectron spectroscopy (XPS) and X-ray absorption spectroscopy (XAS) indicated that the high capacity of RS—$Nb_2O_5$ was associated with its ability to go beyond the $Nb^{5+}/Nb^{4+}$ redox. In addition, the RS structure benefited from an increase in $Li^+$ diffusivity and electrical conductivity compared to its amorphous counterpart, as shown by galvanostatic intermittent titration technique (GITT), peak force tunneling atomic force microscopy (PF-TUNA), and two-point probe conductivity measurement, which correlated closely with its rate performance. Electrochemically induced crystallization of nanomaterials therefore offers an innovative approach for the discovery of high energy/power and stable electrode materials that were previously inaccessible using conventional synthesis methods.

Disclosed embodiments include a new rock-salt $Nb_2O_5$ electrode material produced through an electrochemically-driven crystallization of an amorphous nanochanneled $Nb_2O_5$. The RS—$Nb_2O_5$ exhibits multi-electron redox per Nb for Li-ion storage. DFT calculations reveal significant low-energy lithium migration paths that lead to the exceptional electrochemical performance of the RS—$Nb_2O_5$. The cubic structure affords a material with high rate performance due to increased Li-ion diffusivity and electrical conductivity. In parallel, the new crystal displays high stability owing to the structural integrity upon lithiation/delithiation. The self-organization of atoms into the optimal crystalline structure during electrochemical cycling suggests a new synthetic avenue to access rare metal oxide structures with unique properties. The utilization of electrochemical cycling to form novel crystalline structures can be advantageous in designing other enhanced electrode materials.

Disclosed embodiments include a rock-salt structure formed from an electrochemically-driven amorphous-to-crystalline (a-to-c) transformation of nanostructured $Nb_2O_5$ the rock-salt structure including, upon cycling with lithium ions ($Li^+$), an insertion of lithium ions ($Li^+$) into $Nb_2O_5$ to form the rock-salt structure (RS—$Nb_2O_5$).

In some embodiments the electrochemically-driven amorphous-to-crystalline (a-to-c) transformation of nanostructured $Nb_2O_5$ is performed by cycling a potential between 3.0 V-0.5 V.

In some embodiments the insertion of lithium ions ($Li^+$) into $Nb_2O_5$ further comprises the insertion of three lithium ions ($Li^+$).

In some embodiments the rock-salt structure (RS—$Nb_2O_5$) further comprises a cubic rock-salt phase with the space group of Fm3m.

In some embodiments a lattice parameter a of the cubic rock-salt phase structure is substantially 4.146(7) Å. In some embodiments the cubic rock-salt phase has a crystallite size of substantially 10 nm.

Disclosed embodiments also include an electrode material including a rock-salt transition metal oxide formed from an electrochemically-driven amorphous-to-crystalline (a-to-c) transformation of nanostructured transition metal oxide.

In some embodiments the transition metal oxide is niobium pentoxide ($Nb_2O_5$) and the rock-salt transition metal oxide is rock-salt niobium pentoxide (RS—$Nb_2O_5$) and includes multi-electron redox per Nb for Li-ion ($Li^+$) storage. In some embodiments the multi-electron redox per Nb for Li-ion ($Li^+$) storage further comprises three lithium ions ($Li^+$) per Nb.

In some embodiments the rock-salt niobium pentoxide (RS—$Nb_2O_5$) further comprises a cubic rock-salt phase with the space group of Fm3m.

In some embodiment the transition metal oxide is tantalum pentoxide ($Ta_2O_5$) and the rock-salt transition metal oxide is rock-salt tantalum pentoxide (RS—$Ta_2O_5$).

In some embodiments the rock-salt tantalum pentoxide (RS—$Ta_2O_5$) further comprises a cubic rock-salt phase with the space group of Fm3m.

In some embodiments the transition metal oxide comprises an oxide of a group IVB or group VB transition metal.

In some embodiments the transition metal oxide has an energy difference between the rock-salt structure and the ground state structure of less than 110 meV/atom.

Also disclosed is a method of forming a rock-salt niobium pentoxide (RS—$Nb_2O_5$) structure, the method including forming a nanochanneled niobium oxide (NCNO) structure by electropolishing of niobium (Nb) metal, electrochemically anodizing the electropolished Nb metal to form amorphous nanostructured $Nb_2O_5$, and performing an amorphous-to-crystalline (a-to-c) transformation of amorphous nanostructured $Nb_2O_5$ by cycling with lithium ions ($Li^+$) to form rock-salt niobium pentoxide (RS—$Nb_2O_5$).

In some embodiments forming a nanochanneled niobium oxide (NCNO) structure by electropolishing of niobium (Nb) metal further includes sequentially sonicating the niobium (Nb) metal in acetone, isopropanol, and deionized water, and electropolishing in sulfuric acid in methanol solution.

In some embodiments electrochemically anodizing the electropolished Nb metal to form amorphous nanostructured $Nb_2O_5$ further includes electrochemical anodization using a $K_2HPO_4$ in glycerol solution and anodizing at a voltage of substantially 25 V. As those of ordinary skill in the art having the benefit of this disclosure would understand, 25 V is not the only voltage that can be used. Different voltages, different oxide thickness, and size of nanopores may be implemented. In some embodiments, voltages of 20-40V and oxide thicknesses of a few microns to tens of microns may be used.

In some embodiments the performance of the amorphous-to-crystalline (a-to-c) transformation of amorphous nanostructured $Nb_2O_5$ by cycling with lithium ions ($Li^+$) to form rock-salt niobium pentoxide (RS—$Nb_2O_5$) further comprises cycling at a potential between 3.0 V-0.5 V.

Other advantages, features, and embodiments also exist.

Figure 1:
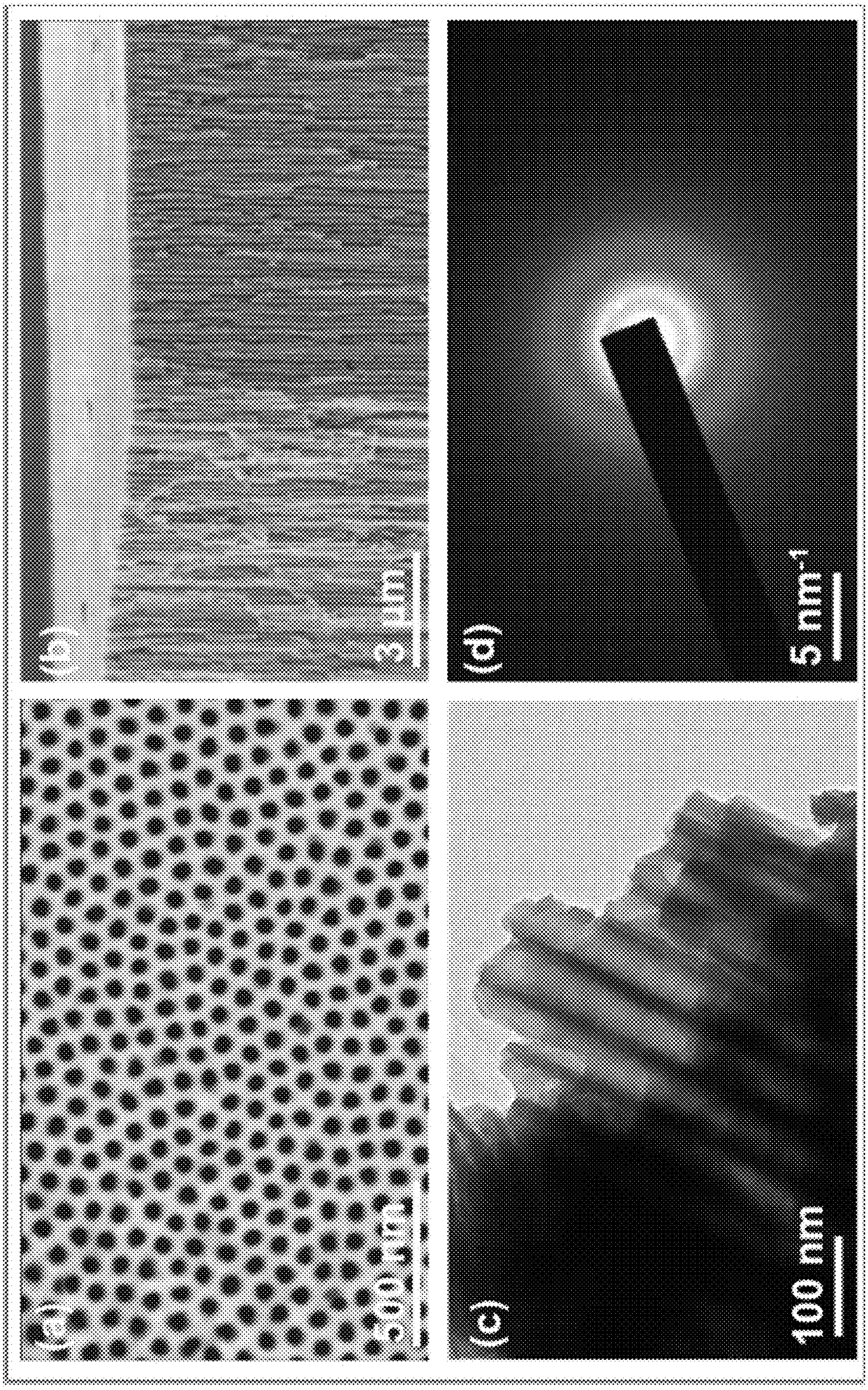
FIG. 1 shows the as-prepared nanochanneled $Nb_2O_5$ (NCNO) in accordance with disclosed embodiments.

While the disclosure is susceptible to various modifications and alternative forms, specific embodiments have been shown by way of example in the drawings and will be described in detail herein. However, it should be understood that the disclosure is not intended to be limited to the particular forms disclosed. Rather, the intention is to cover all modifications, equivalents and alternatives falling within the spirit and scope of the invention as defined by the appended claims.

DETAILED DESCRIPTION

Characterization of As—Prepared Nanochanneled $Nb_2O_5$

FIG. 1 shows the as-prepared nanochanneled $Nb_2O_5$ (NCNO) in accordance with disclosed embodiments. FIG. 1(*a*) is a top view of SEM images of the as-prepared samples. FIG. 1(*b*) is a side view of SEM images of the as-prepared samples. The NCNO has uniform pores with ~56±2.3 nm average pore diameter and ~28±8 nm wall thickness. FIG. 1(*c*) is a low magnification TEM image of the as-prepared samples. FIG. 1(*d*) is an selected area electron diffusion (SAED) image of the as-prepared NCNO samples where the diffuse ring indicates its amorphous nature.

Figure 2:
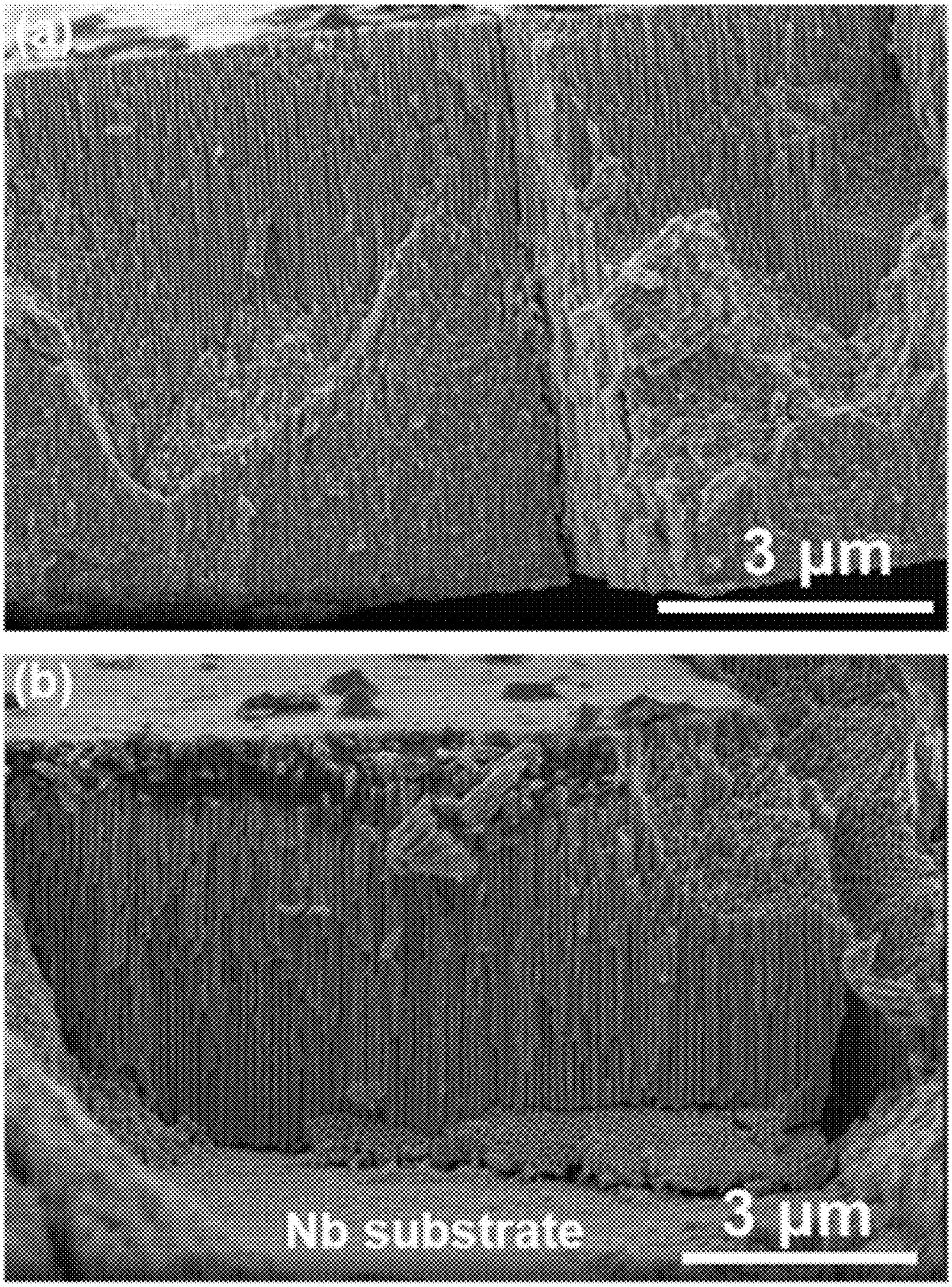
FIG. 2 shows the as-prepared nanochanneled $Nb_2O_5$ (NCNO) in accordance with disclosed embodiments.

FIG. 2 shows the as-prepared nanochanneled $Nb_2O_5$ (NCNO) in accordance with disclosed embodiments. FIG. 2(*a*) shows a side view SEM image of the NCNO freestanding and detached from a niobium substrate and FIG. 2(*b*) shows the NCNO connected to the niobium substrate.

Figure 3:
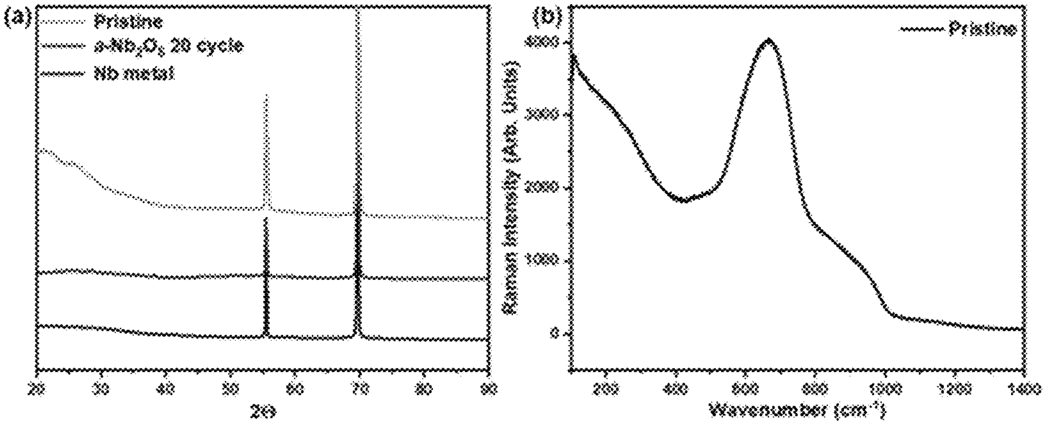
FIG. 3 shows XRD, and Raman spectroscopy of the as-prepared nanochanneled $Nb_2O_5$ (NCNO) in accordance with disclosed embodiments.

The as-prepared samples consisted of vertically oriented nanochanneled niobium oxide (NCNO) electrically connected to a Nb current collector (FIG. 1(*a*) and FIG. 2(*b*)). This particular nanoarchitecture facilitates fast access of the electrolyte to the active walls, as well as facile electron and ion transport for enhanced kinetics. SAED images (FIG. 1(*d*)), XRD, and Raman spectroscopy (FIG. 3) showed that the as-prepared NCNO was amorphous. FIG. 3 shows the characterization of pristine and NCNO electrode cycled above 1.1 V. FIG. 3(*a*) shows XRD of pristine (top-most line), a-$Nb_2O_5$ (middle line), and Nb substrate (bottom line). The a-$Nb_2O_5$ electrode cycled above 1.1 V remained amorphous after 20 cycles. FIG. 3(*b*) shows Raman spectrum of the pristine $Nb_2O_5$. The broad feature in the spectrum suggests the material is amorphous.

a-to-c Transformation of NCNO Via Electrochemical Cycling

Figure 4:
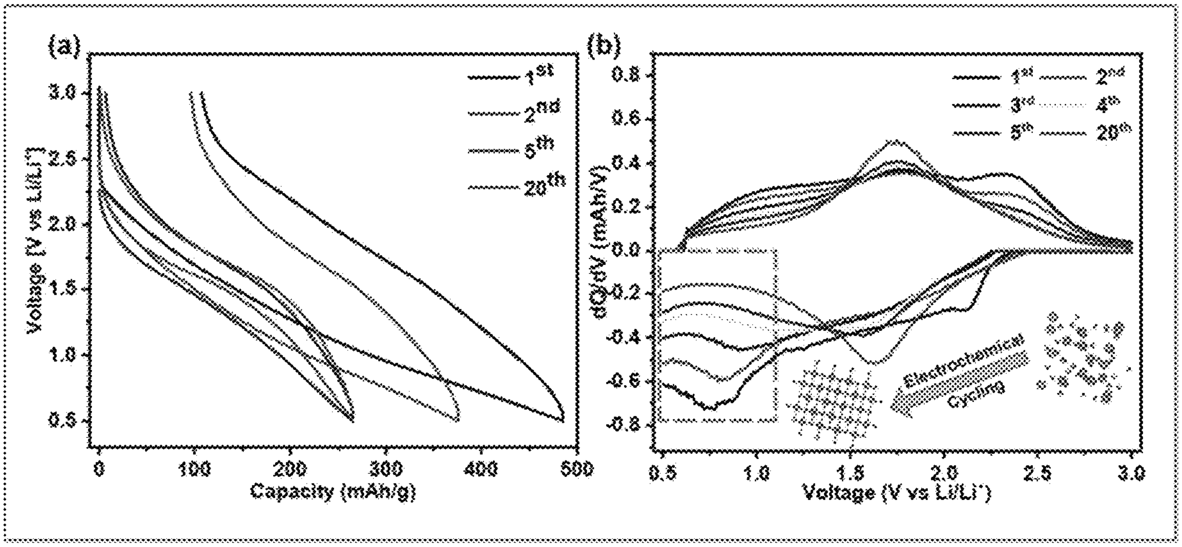
FIG. 4 shows voltage profiles and differential capacity plots of the as-prepared nanchanneled $Nb_2O_5$ (NCNO) in accordance with disclosed embodiments.

The as-prepared NCNO samples were subjected to electrochemical cycling between 3 V and 0.5 V vs. Li/$Li^+$, and the voltage profiles and corresponding differential capacity (dQ/dV) plots for the electrode are shown in FIG. 4. FIG. 4(*a*) shows voltage profiles of the NCNO electrode for the first 20 cycles. FIG. 4(*b*) shows differential capacity (dQ/dV) plots between 3 and 0.5 V vs. Li/$Li^+$. The peak below 1.1 V during discharge (lithiation) is evidence of the a-to-c transformation (dashed inset box). The disappearance of the cathodic peak below 1.1 V beyond the $3^{rd}$ cycle is evidence that the phase transformation has nearly completed.

The voltage profile of the initial discharge is characterized by a shallow, linear slope, which upon subsequent cycling develops a plateau-like feature centered around 1.67 V (FIG. 4(*a*)). The appearance of a plateau is indicative of an increased number of equivalent intercalation sites in a crystalline host material representing a first-order phase transition during intercalation/deintercalation, which suggests an a-to-c phase transformation initiated by electrochemical cycling with $Li^+$.

FIG. 4(*a*) exhibits a large hysteresis during the initial cycle, which may result from mechanical stress, thermodynamic entropic effects, activation polarization, nucleation barriers, and/or lattice distortions within the active material. A significant reduction in the hysteresis was observed on the 5th and 20th cycle. This demonstrates that the electrode self-improved its thermodynamic and kinetic properties through repeated Li insertion/extraction.

Figure 5:
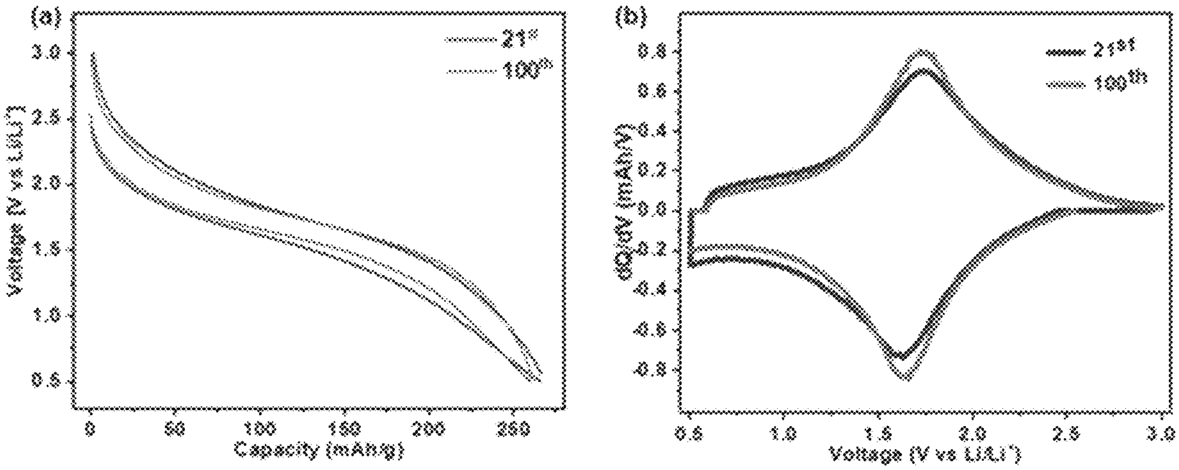
FIG. 5 shows voltage profiles and differential capacity plots of the nanochanneled $Nb_2O_5$ (NCNO) during the 21st and 100th cycle in accordance with disclosed embodiments.

The corresponding differential capacity analysis is shown in FIG. 4(*b*), which allows in-depth identification of phase evolution and self-improvement within the material upon electrochemical cycling. The results highlight the a-to-c phase transformation occurring below 1.1 V (dashed inset box in FIG. 4(*b*)). In the first cycle, the electrode exhibited a capacitor-like response within the majority of the potential window with the exception of below 1.1 V during lithiation. In this region, a cathodic peak developed around 0.78 V and continued to appear on the initial 3 cycles, which is associated with the a-to-c phase transformation. The corresponding anodic peak appeared near 2.31 V. The large peak-to-peak separation is consistent with the large hysteresis seen in FIG. 4(*a*), suggesting initially high nucleation barriers and sluggish kinetics in the intermediate phase, as sluggish charge transfer kinetics cause greater separation of the cathodic and anodic peaks ($\Delta E_p$). By the 4th cycle, the redox peaks near 0.78 V and 2.3 V almost disappeared. Concurrently, a distinct redox peak pair started to evolve around 1.67 V, which suggests a new phase was formed. The $\Delta E_p$ reduced from 140 mV on the 5th cycle to 74 mV on the 100th cycle, indicating continued improvement of the newly formed phase (FIG. 5). FIG. 5 shows voltage profiles and differential capacity plots of the nanochanneled $Nb_2O_5$ during the 21st and 100th cycle. In FIG. 5(*a*) the voltage profiles demonstrate a slightly improved hysteresis between the 21st and 100th cycle. In FIG. 5(*b*) Corresponding dQ/dV plots between 3 and 0.5 V vs Li/$Li^+$. This observation also implies that the new $Nb_2O_5$ structure formed upon a-to-c transformation electrochemically offers improved charge storage and transport kinetics.

Structural Characterization of a-to-c $Nb_2O_5$ Electrode

Figure 6:
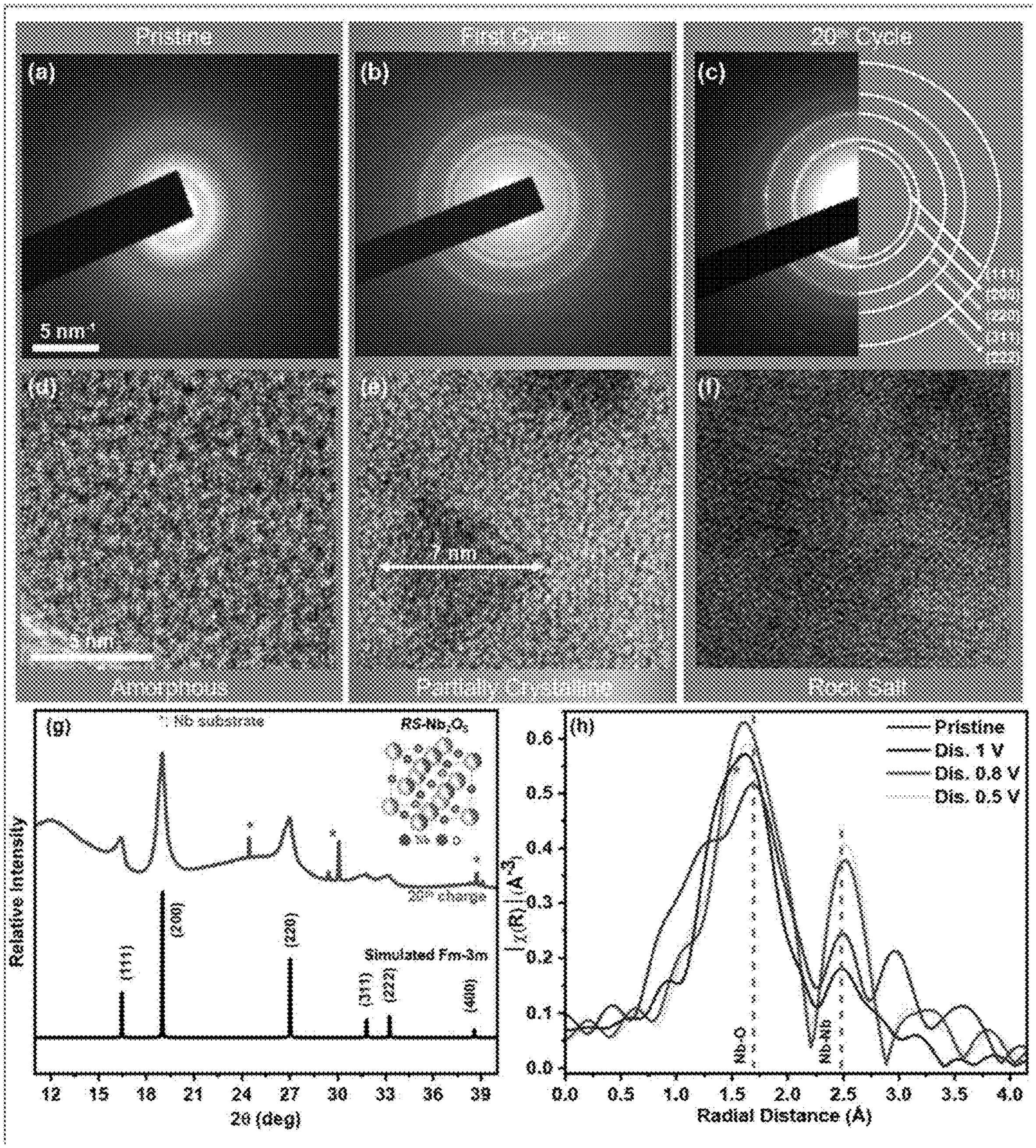
FIG. 6 shows SAED and HR-TEM images of the nanochanneled $Nb_2O_5$ (NCNO) samples in accordance with disclosed embodiments.

TEM, grazing incidence sXRD, and ex situ extended X-ray absorption fine structure (EXAFS) were conducted to elucidate the new rock-salt phase of $Nb_2O_5$ (FIG. 6). FIG. 6 shows SAED and HR-TEM images of the NCNO samples at different stages of electrochemical cycling, grazing incidence XRD of a cycled NCNO sample, and Nb K-edge EXAFS of samples at different states of discharge. FIG. 6(*a*)-(*c*) show SAED images of the samples at the pristine state, after the $1^{st}$ cycle, and after the $20^{th}$ cycle, respectively. FIG. 6(*d*)-(*f*) show corresponding HR-TEM images of the samples in FIG. 6(*a*)-(*c*). For the pristine state, diffuse rings in SAED and an absence of periodic structures in HR-TEM demonstrate its amorphous nature. After the $1^{st}$ cycle, faint and broadened diffraction rings appeared in SAED Defined grains were visible in the HR-TEM, and a ~7 nm crystallite with a lattice spacing of 2.14 Å was shown, indicative of the corresponding (200) planes in the cubic rock-salt phase. After the $20^{th}$ cycle, the phase became fully crystalline, displaying well-defined SAED rings and crystalline domains in HR-TEM. FIG. 6(*g*) shows grazing-incidence sXRD of the NCNO electrode at charged state (delithiated) after 20 cycles. The structure is in good agreement with the simulated rock-salt $Nb_2O_5$ phase (bottom line, space group Fm3m) with a lattice spacing of 4.1466(7) Å. A unit cell of RS—$Nb_2O_5$ is presented in the inset. FIG. 6(*h*) shows the Fourier-transformed EXAFS spectra (not phase shift corrected) at Nb K-edge of the NCNO electrodes during the first discharge at different voltages. The narrowing of the Nb—O peak and increasing intensity of the Nb—Nb peak upon the discharging below 1 V reveal the process of a-to-c transformation. The phase transformation upon electrochemical cycling between 3-0.5 V was first evaluated via SAED and HR-TEM (FIG. 6(*a*)-(*f*)). The pristine sample exhibited diffuse rings in SAED (FIG. 6(*a*)), consistent with the amorphous feature observed in HR-TEM (FIG. 6(*b*)). The SAED pattern began to sharpen after the 1st cycle (FIG. 6(*c*)), suggesting the formation of nanocrystallites within the amorphous matrix (FIG. 6(*d*)). After the $20^{th}$ cycle, both SAED and HR-TEM showed that the oxide had become fully crystalline (FIGS. 6(*e*)-(*f*)). In addition, focused ion beam (FIB)/TEM and ex situ TEM were performed at different locations on an electrode after 100 cycles (FIGS. 7-8) as well as on electrodes at different states of charge (FIG. 9).

Figure 7:
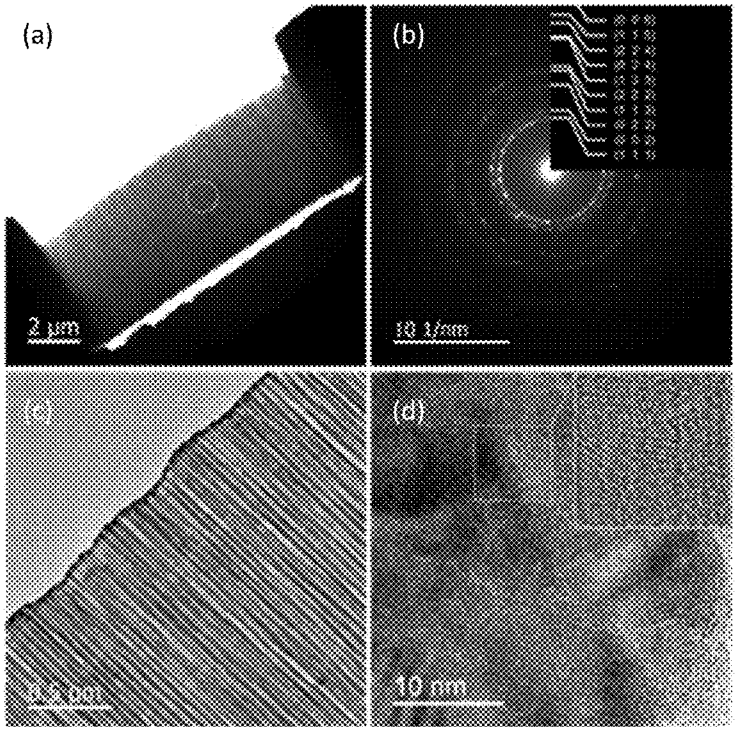
FIG. 7 shows FIB-TEM images of RS—$Nb_2O_5$ after 100 cycles in accordance with disclosed embodiments.
Figure 8:
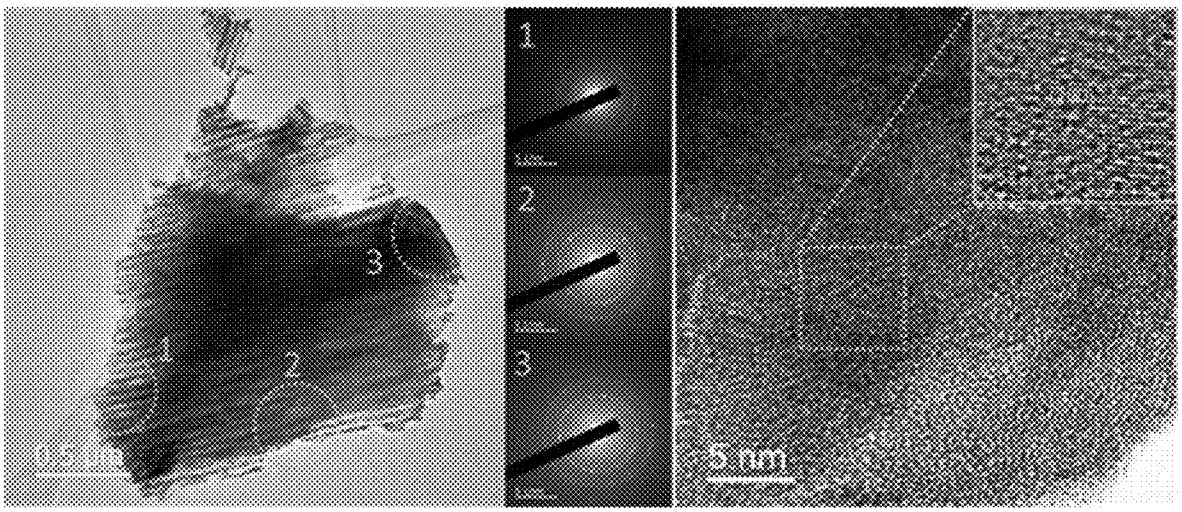
FIG. 8 shows TEM images of an RS—$Nb_2O_5$ sample after 100 cycles at various locations on the sample in accordance with disclosed embodiments.

In particular, FIG. 7(*a*) shows the cross-section of RS—$Nb_2O_5$ after focus ion beam milling. FIG. 7(*b*) shows SAED imaging of the area marked in a dashed circle in FIG. 7(*a*). FIG. 7(*c*) shows TEM imaging of the top area of the sample showing the nanochannel structure. FIG. 7(*d*) shows HR-TEM imaging of the RS—$Nb_2O_5$ sample where the lattice fringes are attributed to the (111) plane of the rock-salt phase. FIG. 8 (left image) is a low magnification TEM image of the sample and the dashed circles (1-3) correspond to the SAED images (FIG. 8, middle image). FIG. 8, right image, is a representative HR-TEM image of the sample.

Figure 9:
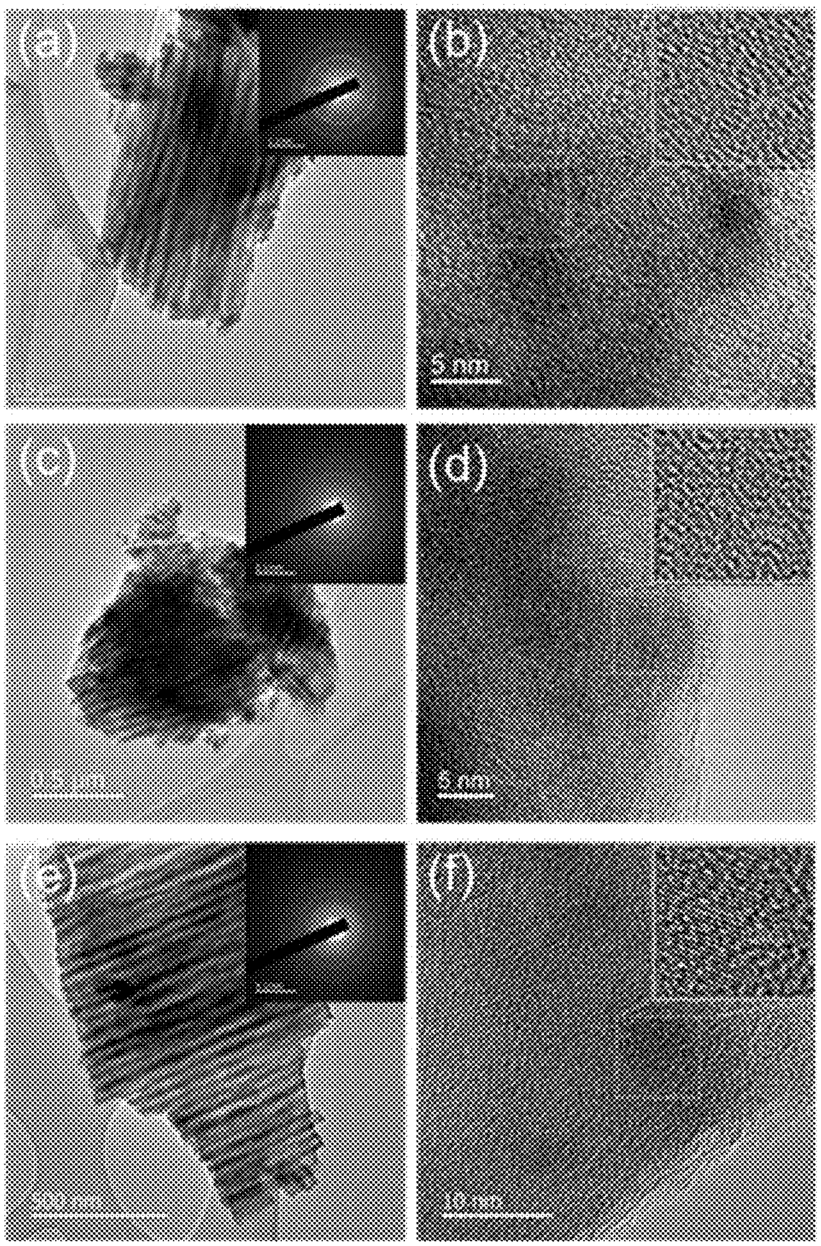
FIG. 9 shows TEM images with SAED insets and HR-TEM images of RS—$Nb_2O_5$ samples at different states of charge (SOCs) in accordance with disclosed embodiments.

In FIG. 9, images (a), (c), and (e) show TEM images with SAED insets and images (b), (d), and (f) show HR_TEM images. The samples were stopped on the $20^{th}$ cycle during charging (Li removal) at voltages of 0.9 V (images (a)-(b)), 2.33 V (images (c)-(d)), and 3 V (images (e)-(f)) vs. Li/Li'. The sample with the highest degree of lithiation (images (a)-(b), charged at 0.9 V) shows better crystallinity than the other two, which suggests that some disordering occurred during Li removal, but the electrode remained crystalline throughout the entire charging process.

Figure 10:
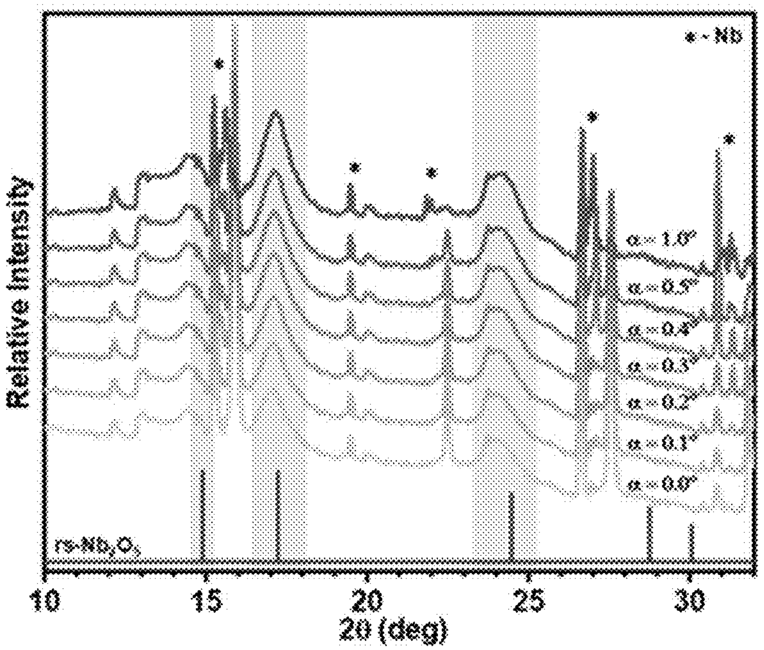
FIG. 10 shows grazing incidence sXRD patterns of a charged (delithiated) RS—$Nb_2O_5$ electrode after 100 cycles corresponding to different incidence angles (a) in accordance with disclosed embodiments.

This shows that the electrode remained crystalline, with no evidence of large amorphous regions or intermediates. Furthermore, grazing incidence sXRD of the delithiated sample (FIG. 10) showed no significant change in peak shape or peak position at different incidence angles, i.e., probing depth. In FIG. 10, the sharp diffraction peaks marked with asterisks are due to the bulk Nb foil substrate. Thus, the sample remains nanocrystalline throughout, indicating the uniformity of the film and insignificant surface disorders. This further suggests the new crystalline structure obtained through electrochemical cycling accounts for the performance improvement compared to its initial amorphous counterpart, which is discussed below.

Determination of the Structure of the Charged (Delithiated) Sample

Figure 11:
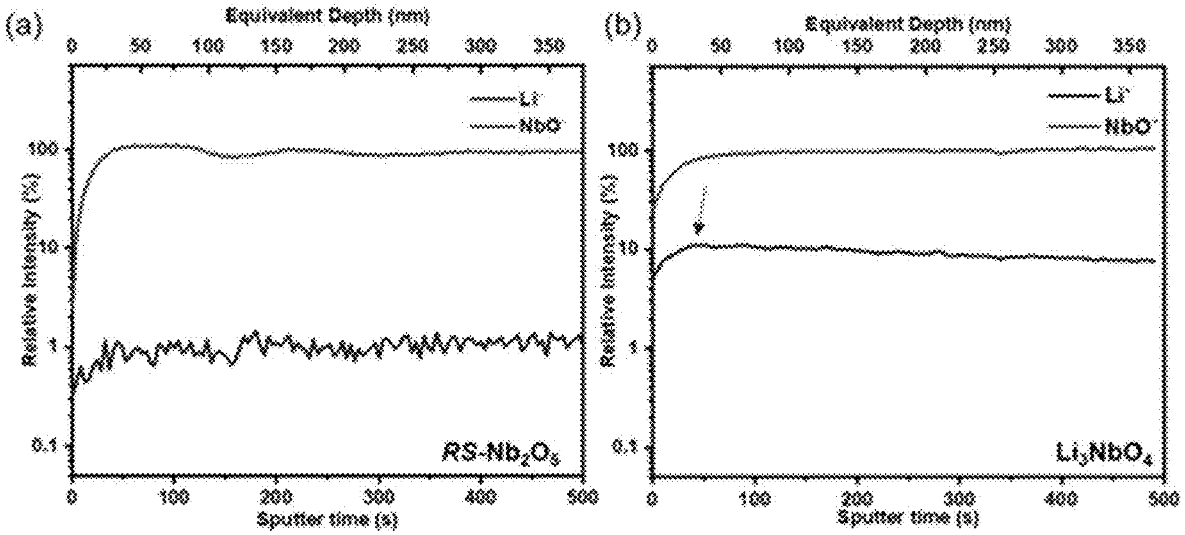
FIG. 11 shows ToF-SIMS depth profiles of RS—$Nb_2O_5$ and a lithium niobate ($Li_3NbO_4$) standard in accordance with disclosed embodiments.

To exclude the possibility that the charged (delithiated) electrode is the rock-salt lithium niobate ($Li_3NbO_4$) other than the niobium oxide, inductively coupled plasma mass spectrometry (ICP-MS) as well as secondary ion mass spectrometry (SIMS) depth profiling were conducted. The composition of the charged electrode is $Li_{0.57}Nb_2O_5$ as measured by ICP-MS. The small Li content compared to Nb is attributed to the residues from the solid electrolyte interphase and electrolyte after cleaning due to the difficulty to remove surface species within the nanochannels of the sample. As shown in FIG. 11, in the RS—$Nb_2O_5$ sample, $Li^-/NbO^-$ ratio is about 1% (FIG. 11(*a*)), and in the $Li_3NbO_4$ sample, $Li^-/NbO^-$ ratio is about 10% (FIG. 11(*b*)). Based on these data, the Li/Nb ratio in the RS—$Nb_2O_5$ sample is ~1/10 of that in the $Li_3NbO_4$ sample. Therefore, it is determined that the Li/Nb ratio in the RS—$Nb_2O_5$ sample is about 0.3, which agrees with the ICP-MS result. There is no significant change in terms of the Li concentration across the depth measured, which suggests the uniformity of the sample. Furthermore, the new RS phase is smaller in a by 0.0673 Å from the reported RS lithium niobate structure with a cell parameter of 4.214 Å (ICSD: #109053). The results confirm that the new phase is RS—$Nb_2O_5$ not RS—$Li_3NbO_4$. Notably, the a-to-c phase transformation was not observed when the NCNO electrode was cycled above 1.1 V even with extended cycling and the electrode remained amorphous (e.g., FIG. 3(*a*), FIG. 12).

To exclude the possibility that the charged (delithiated) electrode could be the rock-salt lithium niobate ($Li_3NbO_4$), additional results were obtained from secondary ion mass spectrometry depth profile (FIG. 11) and inductively coupled plasma mass spectrometry. As shown in FIG. 11, in the RS—$Nb_2O_5$ sample, $Li^-/NbO^-$ ratio is about 1%, and in the $Li_3NbO_4$ sample, $Li^-/NbO^-$ ratio is about 10%. Based on these data, the Li/Nb ratio in the RS—$Nb_2O_5$ sample is ~1/10 of that in the $Li_3NbO_4$ sample. Therefore, it is determined that the Li/Nb ratio in the RS—$Nb_2O_5$ sample is about 0.3. The results confirm that the new phase is RS—$Nb_2O_5$ not RS—$Li_3NbO_4$. Notably, the a-to-c phase transformation was not observed when the NCNO electrode was cycled above 1.1 V even with extended cycling and the electrode remained amorphous (e.g., FIG. 3(*a*), FIG. 12).

Figure 12:
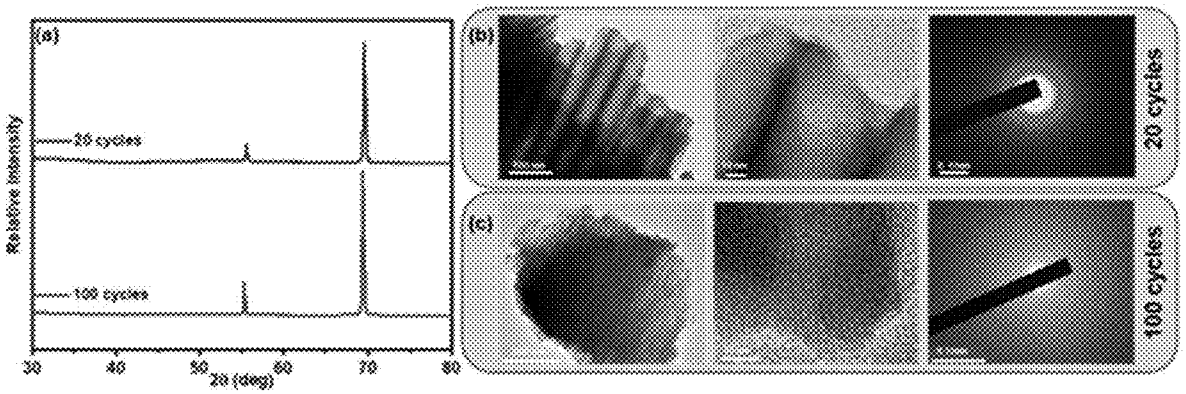
FIG. 12 shows characterization of electrodes cycled above 1.1 V at different cycles in accordance with disclosed embodiments.

FIG. 12(*a*) shows XRD of a-$Nb_2O_5$ at the $20^{th}$ (top line) and $100^{th}$ cycle (bottom line). The electrodes remained amorphous. FIG. 12(*b*)-(*c*) show TEM, HR-TEM, and SAED images of electrodes after $20^{th}$ and $100^{th}$ cycle, respectively. Both the diffuse ring in SAED and non-existence of lattice fringes in HR-TEM suggest the amorphous nature of the electrodes.

Figure 13:
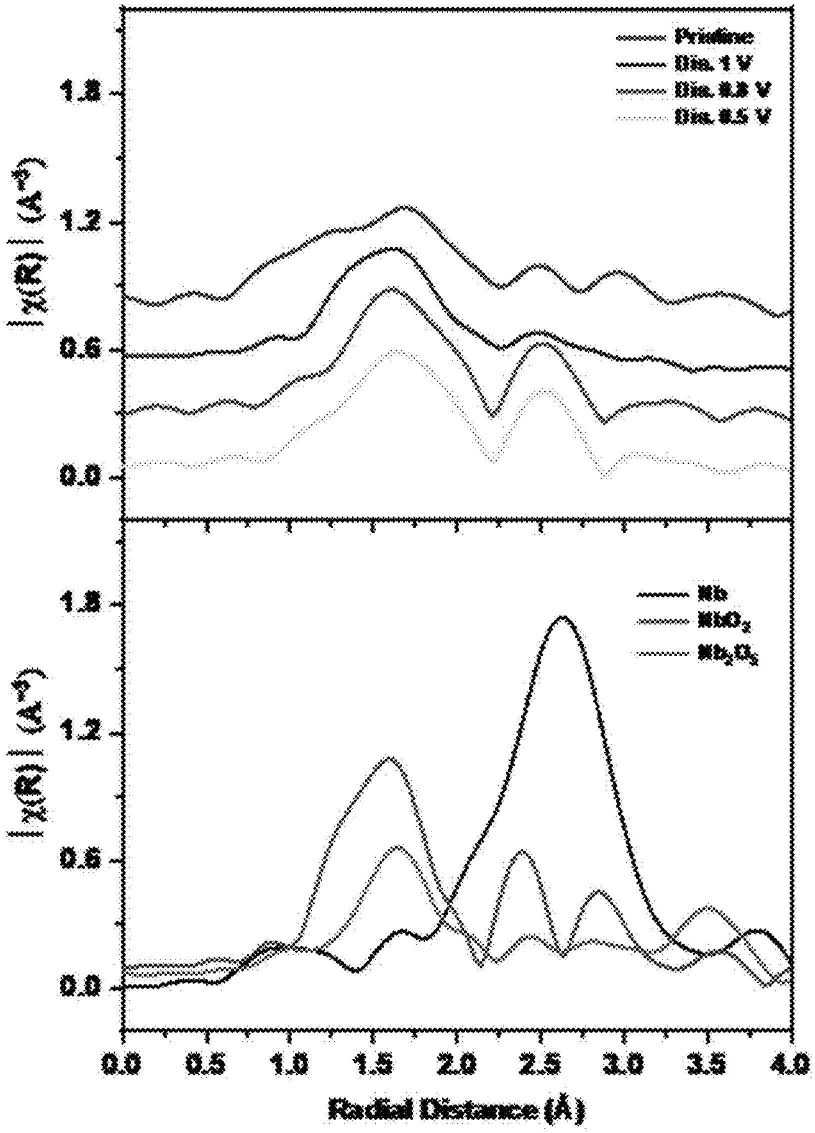
FIG. 13 shows standard EXAFS spectra for Nb, $NbO_2$, and $Nb_2O_5$ in accordance with disclosed embodiments.

Ex situ EXAFS analysis was utilized to examine the local structural evolution of Nb during the first discharge (lithiation) (FIG. 6(*h*)). Standard EXAFS spectra for Nb, $NbO_2$, and $Nb_2O_5$ are provided in FIG. 13. As shown in FIG. 13, Fourier transformed EXAFS spectra (non-phase shift corrected) at Nb K-edge of pristine sample and samples at different states of discharge during the first discharge (top) in comparison to standards of Nb, $NbO_2$, and $Nb_2O_5$ (bottom).

In the pristine sample, two broad peaks near 1.6 Å and 2.5 Å were assigned to Nb—O and Nb—Nb bond, respectively. The amorphous material contains distorted $NbO_6$, $NbO_7$, and $NbO_8$, causing large variation in the Nb—O and Nb—Nb distances. Discharging to lower voltages led to narrowing of the Nb—O peak, accompanied by intensity increase in the Nb—Nb peak as shown in Table I below. This implies the a-to-c transformation. The a-to-c transformation would require ordering of the distorted polyhedra, leading to converging radial distances, and higher intensity from the coordinated Nb—O and Nb—Nb shell.

TABLE I

| | Full Width at Half Maximum (Å) | Intensity ($\lvert\chi(R)\rvert(A^{-3})$) |
|---|---|---|
| Pristine | 1.042 | 0.517 |
| Discharged to 1 V | 0.609 | 0.572 |
| Discharged to 0.8 V | 0.583 | 0.630 |
| Discharged to 0.5 V | 0.580 | 0.591 |

Multielectron Redox of the RS—$Nb_2O_5$ Electrode

Figure 14:
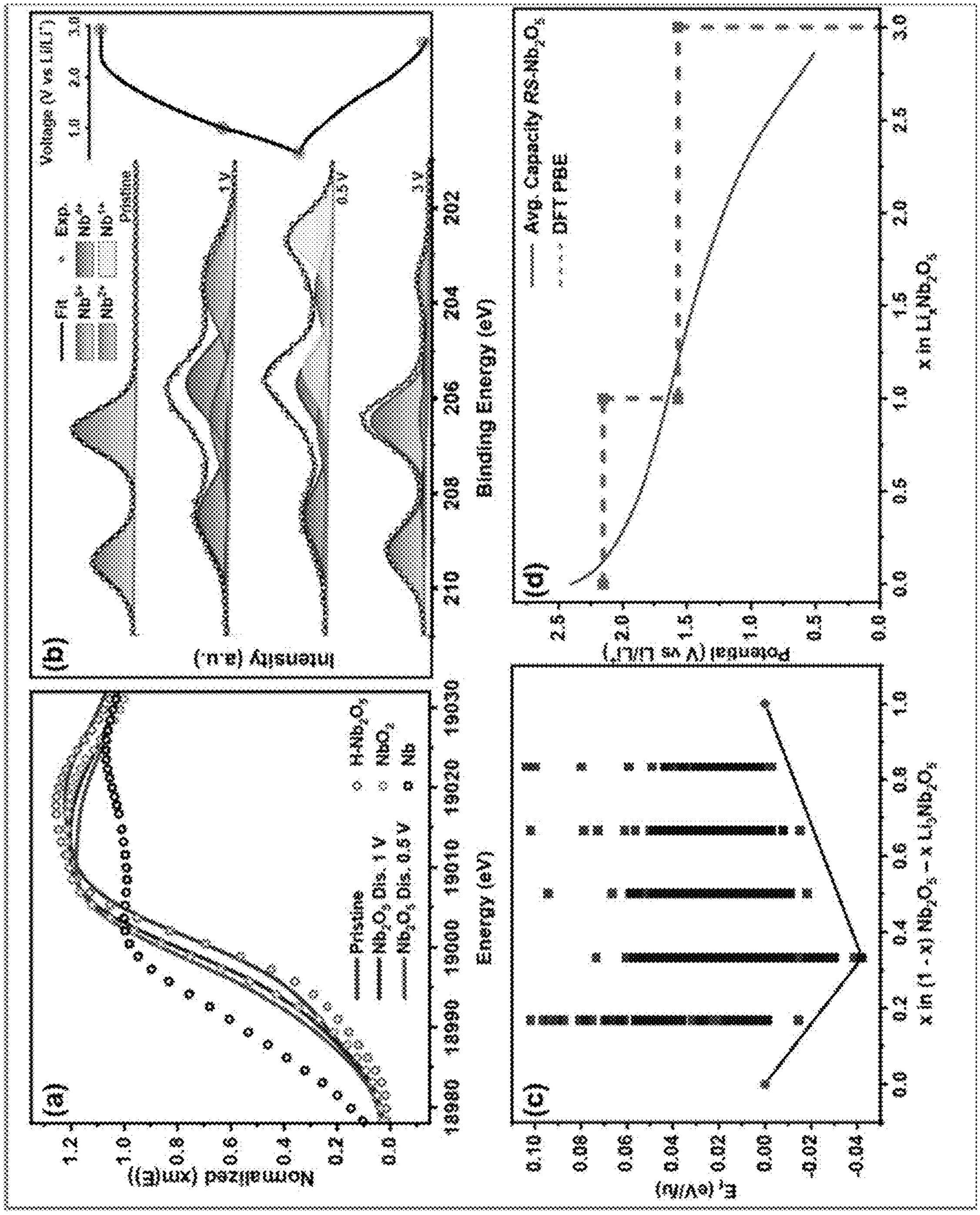
FIG. 14 shows characterization of the oxidation state of Nb in RS—$Nb_2O_5$, compound phase diagram computed by PBE, and voltage profiles of $Li_xNb_2O_5$ in accordance with disclosed embodiments.

Ex situ Nb K-edge X-ray absorption near edge structure (XANES) and XPS were carried out to evaluate the valence state of Nb in the sample at various states of discharge (FIG. 14(*a*)-(*b*)). The XANES spectrum from the pristine sample most closely matched the H—$Nb_2O_5$ standard, indicating a Nb oxidation state in the bulk of around +5. Upon discharging to 1 V, the edge position of the sample nearly matched the NbO2 standard, suggesting the Nb oxidation state decreased to +4. A further discharge to 0.5 V shifted the edge of the spectrum to even lower energy, indicating a Nb oxidation state below +4 in the bulk of the electrode.

As shown in FIG. 14(*a*), the Nb K-edge XANES of $Nb_2O_5$ electrodes at various states of discharge. The lower edge position of electrode discharged at 0.5 V compared to the standard $NbO_2$ indicates the lower oxidation state of Nb than +4. As shown as FIG. 14(*b*) the XPS spectra of the RS—$Nb_2O_5$ electrodes upon lithiation/delithiation processes in the range 3-0.5 V. As shown in FIG. 14(*c*), the compound phase diagram was computed using the PBE functional. The two end members are $Nb_2O_5$ and $Li_3Nb_2O_5$. The compositional resolution of x=0.5 increments in $Li_xNb_2O_5$ was used across the whole region of the phase diagram. An intermediate stable phase was observed at the composition $LiNb_2O_5$. As shown in FIG. 14(*d*), the comparison between experimental and computational voltage profiles of $Li_xNb_2O_5$ ($0 \le x \le 3$) upon electrochemical cycling. The average PBE voltage of 1.76 V agrees with the measured voltage of 1.67 V.

Ex situ Nb 3d core level XPS spectra (FIG. 14) were obtained from electrodes at open-circuit voltage, discharged to 1.0 V and 0.5 V, and charged back to 3.0 V. At open circuit, the sample exhibited $Nb_{3/2}$ and $Nb_{5/2}$ peaks at 209.5 and 206.7 eV, indicating $Nb^{5+}$. Upon discharging to 1 V, the primary peaks were shifted 1.0 eV lower, consistent with the reduction from $Nb^{5+}$ to $Nb^{4+}$ seen in the XANES spectra. In addition, two new sets of doublets appeared at lower binding energies of 206.5/203.6 eV and 205.4/202.6 eV, corresponding to $Nb^{2+}$ and $NW^{+}$, respectively. Further discharging to 0.5 V resulted in increased intensity of the $Nb^{1+}$ peak relative to the $Nb^{2+}$ and $Nb^{4+}$ peaks, suggesting significant reduction of Nb. As XPS is a surface technique (probing the top 10 nm of a surface), the results suggest that the surface of the RS—$Nb_2O_5$ may experience larger reduction, forming suboxides not present in the bulk. Upon charging back to 3.0 V, the electrode returned to $Nb^{5+}$, with only minimal residual $Nb^{4+}$ and $Nb^{2+}$. The XPS results demonstrate that the Nb in RS—$Nb_2O_5$ undergoes multielectron redox in Nb (>1:1 Li/Nb) upon lithiation/delithiation and that the process is reversible. In comparison, a DRX $Li_3NbO_4$ has been reported as high-capacity positive electrode, but it was claimed that the Nb ion stayed pentavalent throughout the charging/discharging processes and the charge compensation was achieved through solid-state redox of oxygen ions.

The voltage profile for lithium intercalation into RS—$Nb_2O_5$ was simulated using density functional theory (DFT). The pseudo-binary RS—$Nb_2O_5$—$Li_3Nb_2O_5$ phase diagram constructed from these calculations is shown in FIG. 14(*c*) and the calculated and experimental voltage profiles are plotted in FIG. 14(*d*). Overall, the average Perdew-Burke-Ernzerhof (PBE) voltage is 1.76 V, which is in excellent agreement with the experimental average voltage of 1.67 V.

High Rate Performance and Cycling Stability

Figure 15:
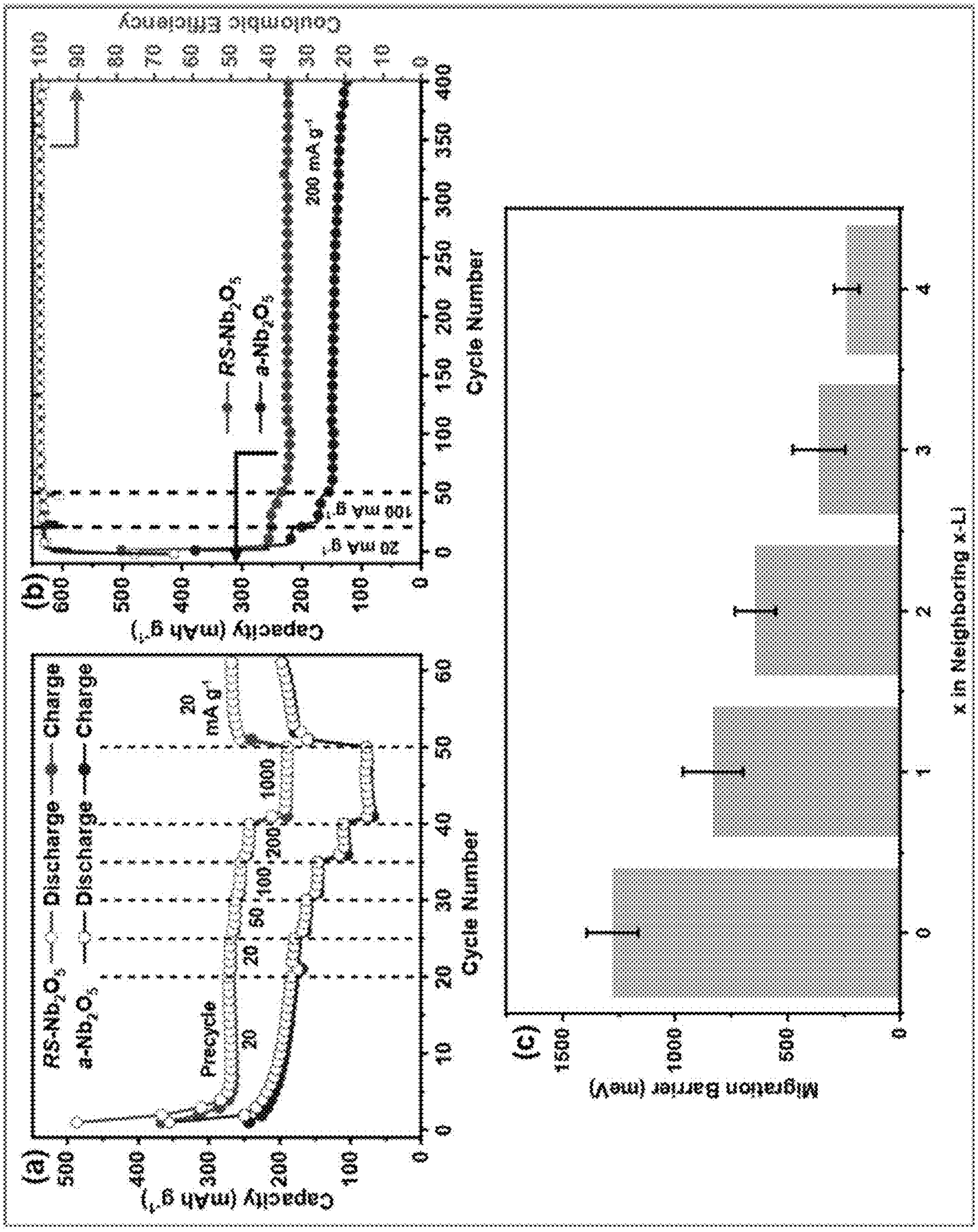
FIG. 15 shows electrochemical performance of RS—$Nb_2O_5$ and a-$Nb_2O_5$ sample with calculated migration barrier for RS—$Li_3Nb_2O_5$ in accordance with disclosed embodiments.

The rate capability of RS— and a-$Nb_2O_5$ electrodes at different current rates of 20, 50, 100, 200, and 1000 mA $g^{-1}$ is shown in FIG. 15(*a*). Specifically, FIG. 15(*a*) shows rate capability of RS— and a-$Nb_2O_5$ electrodes. While the a-$Nb_2O_5$ electrode retained 43% of its low-rate capacity at a 1000 mA $g^{-1}$ rate, the RS—$Nb_2O_5$ electrode was able to retain over 70% of its low-rate capacity under the same condition. FIG. 15(*b*), shows a comparison of the cycling stability of RS— and a-$Nb_2O_5$ electrodes. By the $400^{th}$ cycle, the RS—$Nb_2O_5$ electrode reached a Coulombic efficiency (CE) of 99.93%, as compared to the 98.78% CE of the a-$Nb_2O_5$ electrode. FIG. 15(*c*) shows distributions of Li migration barriers at the end of discharge in RS—$Li_3Nb_2O_5$. The different local environments are categorized by the number of neighboring sites occupied with Li ions, and thus termed neighbors x-Li ($0 \le x \le 4$). There are 2, 12, 12, 10, 2 hopping paths for 0, 1, 2, 3, 4 Li local environments, respectively. For each local environment, a distribution of calculated NEB barriers with standard deviation represented by an error bar is shown.

Figure 16:
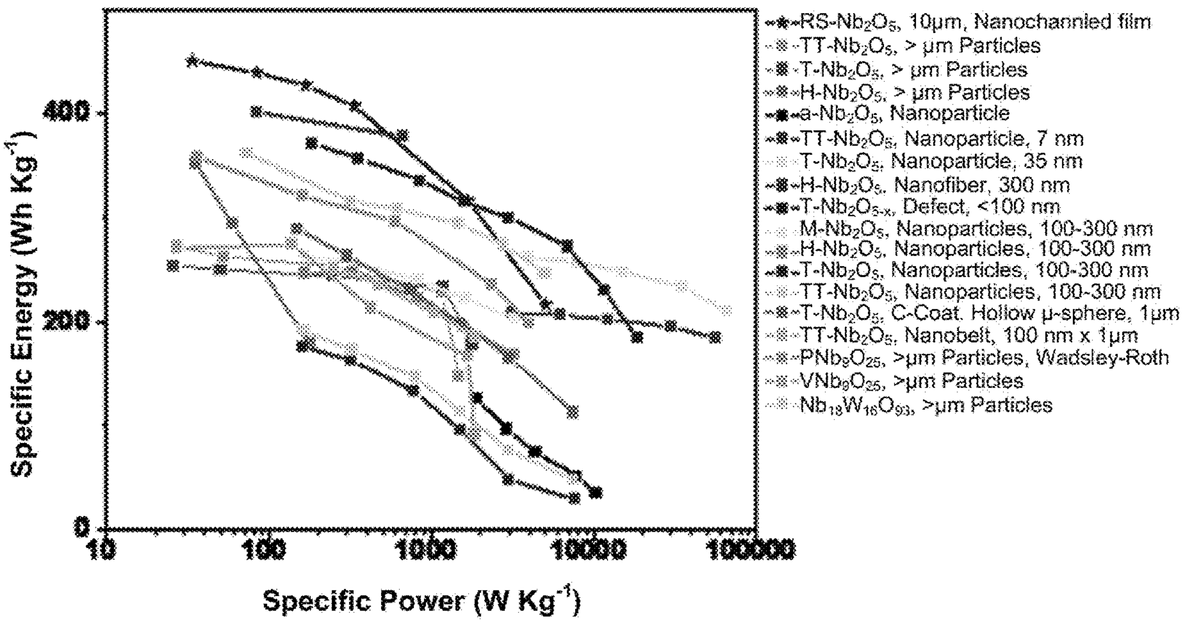
FIG. 16 shows a Ragone plot of reported $Nb_2O_5$ and niobate electrodes as compared to RS—$Nb_2O_5$ in accordance with disclosed embodiments.

The RS—$Nb_2O_5$ electrode exhibited a high reversible capacity of 269 mAh $g^{-1}$ at a current density of 20 mA $g^{-1}$, corresponding to ~1.42 electron redox per Nb. The high capacity of RS—$Nb_2O_5$ is among the best of reported $Nb_2O_5$ and niobate electrodes (see FIG. 16). FIG. 16 shows the electrochemical performance of RS—$Nb_2O_5$ electrode compared with high-performance electrodes gathered from existing literature. Amorphous and crystalline (H—, TT-, T-$Nb_2O_5$) materials are designated according to film/particle size.

Figure 17:
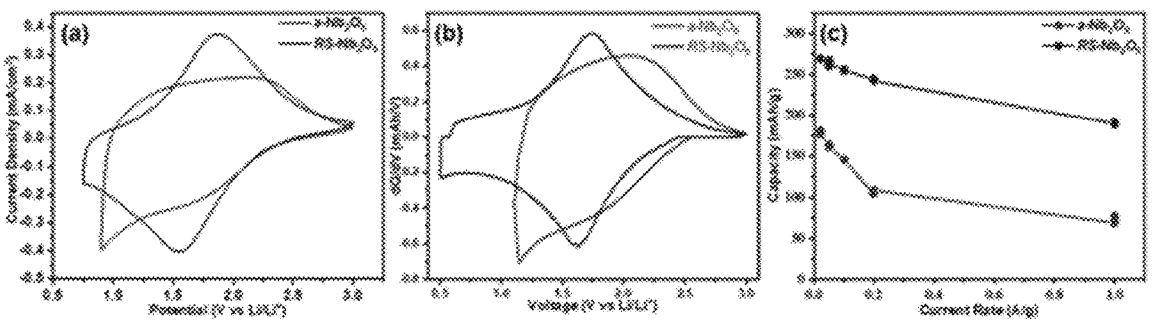
FIG. 17 shows electrochemcial performance of RS— and a-$Nb_2O_5$ electrodes in accordance with disclosed embodiments

Additionally, we observed a <10% drop in capacity at an increased current rate of 200 mA $g^{-1}$ (243 mAh $g^{-1}$), while at a current rate of 1000 mA $g^{-1}$ the electrode capacity was slightly lower at 191 mAh $g^{-1}$. In comparison, a-$Nb_2O_5$ electrode at the rate of 1000 mA $g^{-1}$ showed a considerably lower capacity (73 mAh $g^{-1}$). The a-$Nb_2O_5$ electrode retained only 43% of its low-rate capacity, while the RS—$Nb_2O_5$ was able to retain over 70% of its low-rate capacity when discharging/charging within 12 min. When the current rate was subsequently returned to 20 mA $g^{-1}$, the capacity of the RS—$Nb_2O_5$ electrode returned to 267 mAh $g^{-1}$, suggesting its great reversibility and rate capability. These results are further elaborated in FIG. 17, which highlights the dramatic difference of the two electrodes through cyclic voltammetry, dQ/dV, and rate capability. FIG. 17(*a*) shows the cyclic voltammograms reveal the dramatic difference of the two electrodes in current response at a scan rate of 0.2 mV/s on the $15^{th}$ cycle. The RS electrode exhibits higher charge storage than a-$Nb_2O_5$ electrode under the same condition. FIG. 17(*b*) is a dQ/dV plot for RS— and a-$Nb_2O_5$ electrodes on the $20^{th}$ cycle. FIG. 17(*c*) shows modified Peukert plots showing capacity as a function of current density of the two electrodes.

Figure 18:
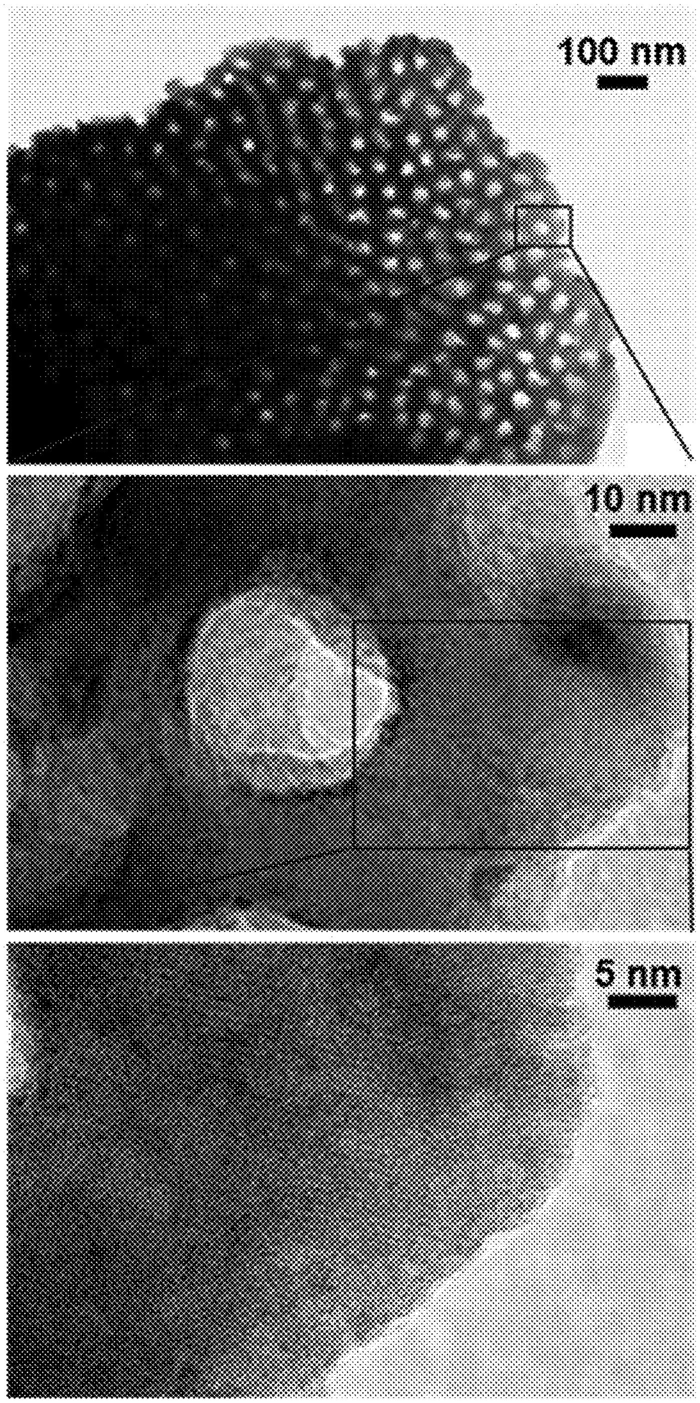
FIG. 18 shows TEM images of RS—$Nb_2O_5$ after 100 cycles in accordance with disclosed embodiments.

The cycle life of the RS—$Nb_2O_5$ and a-$Nb_2O_5$ electrodes at a current rate of 200 mA $g^{-1}$ is shown in FIG. 15(*b*). The RS—$Nb_2O_5$ electrode exhibited a high reversible capacity of 224 mAh $g^{-1}$ at the 400th cycle with a 0.02% capacity loss. During the first four formation cycles of RS—$Nb_2O_5$ (at 20 mA $g^{-1}$), the initial Coulombic efficiency (CE) was 75%. After 10 cycles, the CE of the electrode exceeded 99%. By the 400th cycle, the electrode demonstrated a CE of more than 99.93%. In comparison, the a-$Nb_2O_5$ electrode exhibited a CE of 98.78% and experienced a capacity loss of more than 15% by the 400th cycle. The improved stability of the RS—$Nb_2O_5$ electrode can be attributed to the retention of its cubic framework and its nanostructure throughout the lithiation/delithiation processes (see FIG. 18). FIG. 18 shows the structural integrity of the tubes remained after 100 cycles. This indicates high structural stability in the nanoarchitecture of the niobium oxide throughout the lithiation/delithiation processes. In addition, the rock salt structure remains after the $100^{th}$ cycle.

Charge Storage and Transport Kinetics of RS—$Nb_2O_5$

Figure 19:
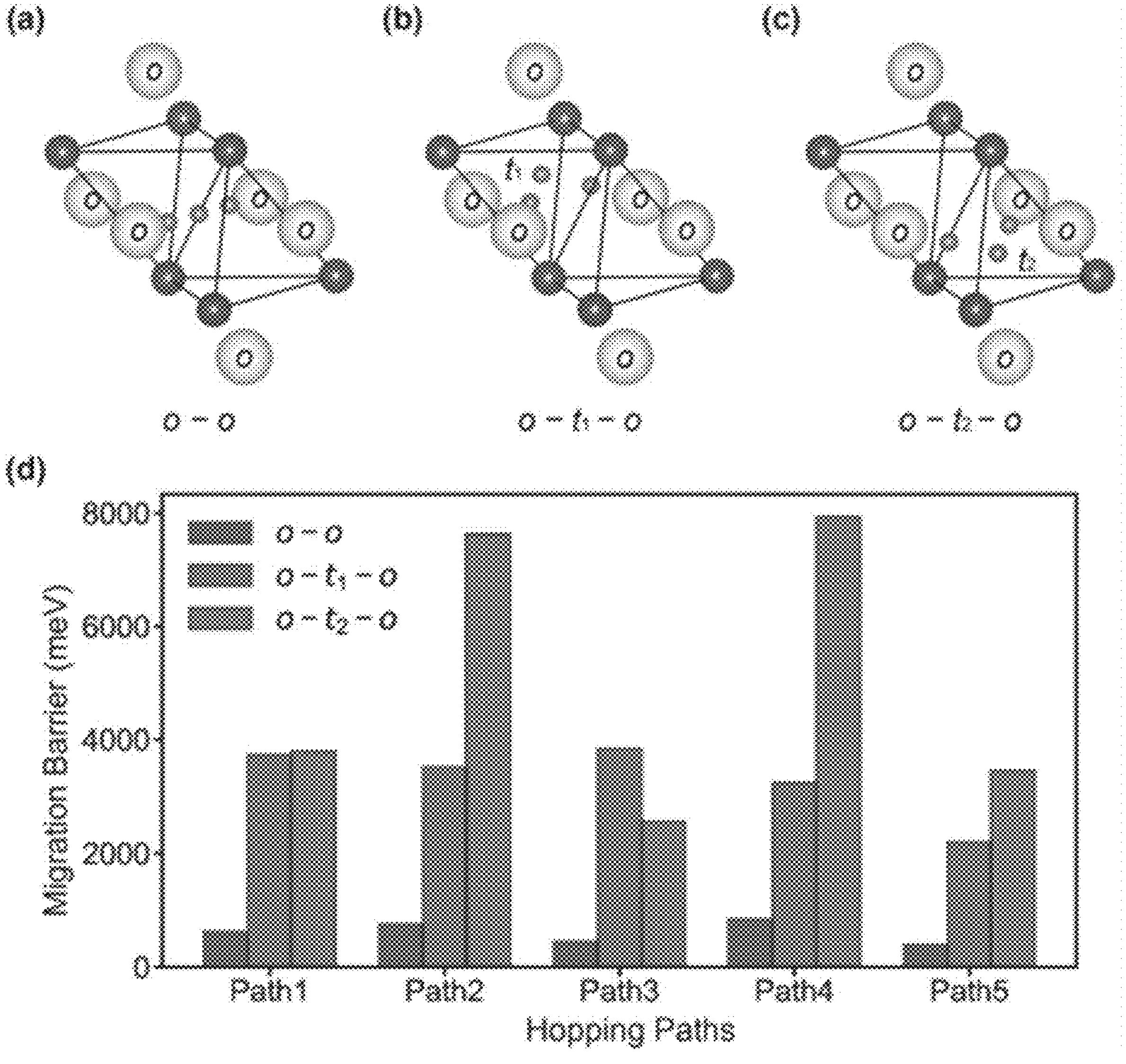
FIG. 19 shows comparison of the energetics between direct octahedral-octahedral (o-o) hop and octahedral-tetrahedral-octahedral (o-t-o) hop in accordance with disclosed embodiments.

To elucidate the lithium migration mechanisms in $Li_3Nb_2O_5$, the kinetically resolved activation barriers for 38 Li hopping paths, sampled from 6 representative low energy configurations to account for the possible effect of the local environments, were calculated. In contrast to the DRX lithium transition metal oxide cathodes, it was found that a direct octahedral-octahedral (o-o) hop is preferred compared to an octahedral-tetrahedral-octahedral (o-t-o) hop (see FIG. 19). FIGS. 19(*a*)-(*c*) show the o-o hop, o-t-o hop through upper tetrahedral site, and o-t-o hop through lower tetrahedral site of Li in RS—$Li_3Nb_2O_5$, respectively. The upper and lower tetrahedral sites were differentiated due to the asymmetry of the neighboring Li and Nb ions. FIG. 19(*d*) shows comparison of the kinetically resolved activation barriers of sampled five hopping paths in terms of three types of hops. The o-o hop is energetically more favorable than the o-t-o hops.

Figure 20:
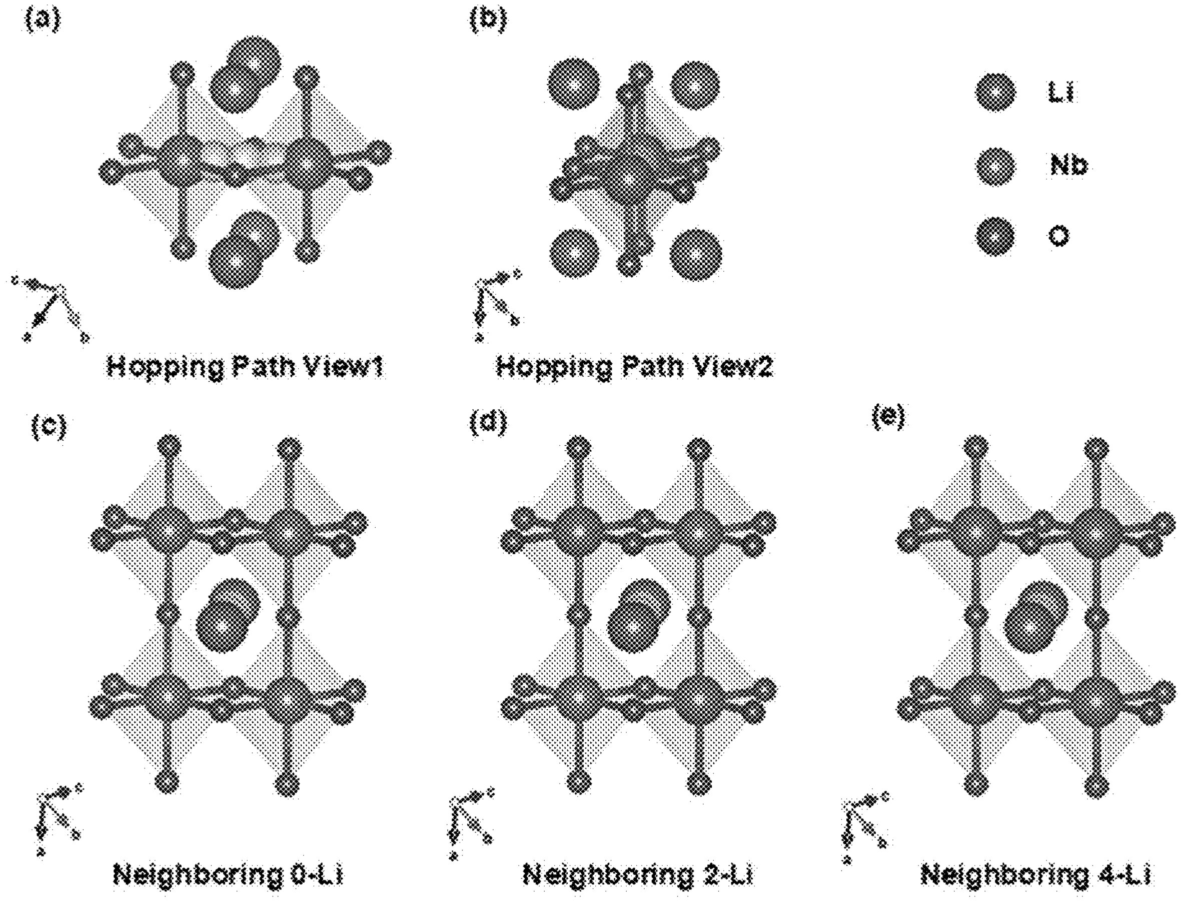
FIG. 20 shows an illustration of the hopping path and the neighboring octahedral sites around the path in accordance with disclosed embodiments.

The local environment along the o-o hop can be characterized by x-Li, where 0≤x≤4 is the number of Li ions occupying the neighboring edge-sharing octahedral sites of a migration path (see FIG. 20). FIG. 20(*a*)-(*b*) show two views of the direct octahedral-octahedral (o-o) hopping path of Li in RS—$Li_3Nb_2O_5$. There are four neighboring edge-sharing octahedral sites that have substantial effect on the migration barrier of the path. The local environment along the o-o hop is characterized by x-Li, where 0≤x≤4 is the number of Li ions occupying the neighboring edge-sharing octahedral sites of a hopping path. FIG. 20(*c*)-(*e*) show the 0-Li, 2-Li, and 4-Li local environment of the paths, where none of the neighboring sites, half of the neighboring sites, and all neighboring sites are occupied by Li. The number of Nb occupying the neighboring sites is 4−x. As shown in FIG. 15(*c*), an increase in x-Li significantly decreases the migration barriers due to lower electrostatic repulsion from $Li^+$ compared to $Nb^{3+/4+}$.

While the migration barriers for 2 or fewer Li in neighboring octahedra are >750 meV, the 4-Li and 3-Li pathways have barriers below 350 meV, which are significantly lower than the 420-520 meV observed for lithium migration in graphite. This observation is similar to what has been reported for DRX cathodes, where a larger number of transition metals adjacent to intermediate tetrahedral site also leads to higher barriers. Assuming a completely random arrangement of Li and Nb, it is expected that 4-Li and 3-Li hops would form ~47% ($0.6^4$+$^4C_3$ $0.6^3$ 0.4) of migration pathways in $Li_3Nb_2O_5$, creating a percolating network of low-barrier pathways for fast Li diffusion.

Charge Transport Kinetics of RS—$Nb_2O_5$

To comprehensively investigate the charge storage and transport kinetics of RS—$Nb_2O_5$, kinetic analyses through GITT and CV with varying scan rates were conducted. These studies provide further evidence of the enhanced kinetics of the new cubic phase compared to its amorphous counterpart through improved ion mobility. These exceptional properties of RS—$Nb_2O_5$ facilitate high power performance.

Figure 29:
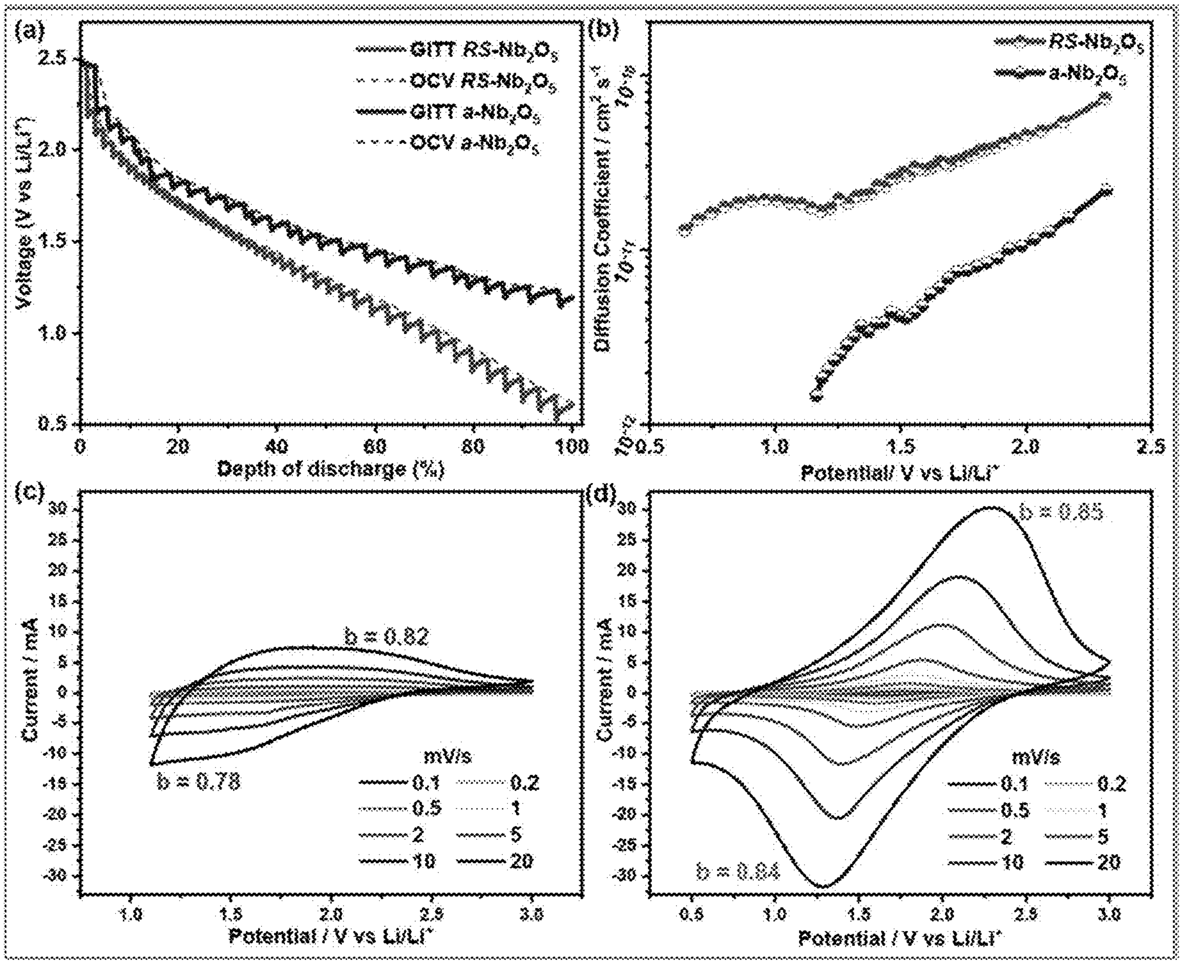
FIG. 29 shows GITT measurements and the corresponding logarithmic plot of $Li^+$ diffusivity as a function of voltage and charge storage kinetics in RS—$Nb_2O_5$ and a-$Nb_2O_5$ in accordance with disclosed embodiments.

GITT measurements and the corresponding logarithmic plot of $Li^+$ diffusivity as a function of voltage are shown in FIG. 29(*a*)-(*b*), revealing the enhanced $Li^+$ diffusivity in the new cubic phase compared to a-$Nb_2O_5$. The $Li^+$ diffusion coefficient of $7.34\times10^{-11}$ $cm^2$/s in RS—$Nb_2O_5$ at the onset of discharge is more than 3× higher than that of $2.19\times10^{-11}$ $cm^2$/s in a-$Nb_2O_5$. During the cathodic scan, both samples experienced a gradual decrease in diffusivity as more $Li^+$ occupied the vacant sites in the host material. It is worth noting that below 1.1 V, $Li^+$ diffusivity in RS—$Nb_2O_5$ slightly increased, concurrent with the ongoing phase transformation upon cycling. Overall, RS—$Nb_2O_5$ exhibited an order of magnitude higher $Li^+$ diffusivity during lithiation compared to a-$Nb_2O_5$ within the potential window. For comparison, TT-$Nb_2O_5$, T-$Nb_2O_5$, and H—$Nb_2O_5$ show $Li^+$ diffusivities in the ranges $10^7$-$10^5$, $10^{-15}$-$10^{-13}$, and $10^{-13}$-$10^{-11}$ $cm^2$ $s^{-1}$, respectively. Comparison of the electrochemical performance of the new RS—$Nb_2O_5$ electrodes with existing $Nb_2O_5$ electrode materials reported to date, demonstrate its superior electrochemical performance (see FIG. 16).

Figure 21:
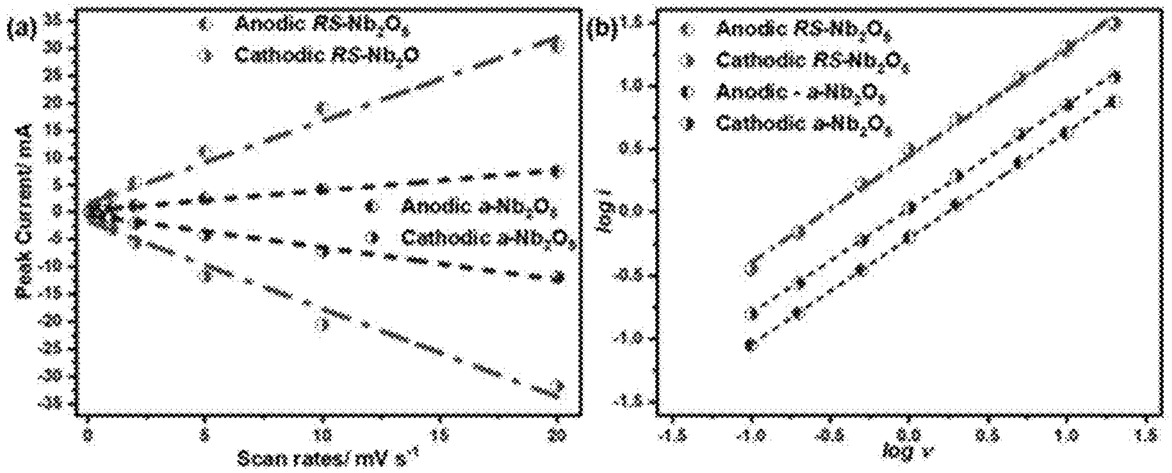
FIG. 21 shows b-value determination of the RS—$Nb_2O_5$ electrode in accordance with disclosed embodiments.

The charge storage kinetics in RS—$Nb_2O_5$ and a-$Nb_2O_5$ sample were evaluated by cyclic voltammetry at varying scan rates (FIG. 29(*c*)-(*d*)). Insights in terms of diffusion and capacitive contribution to Li storage can be obtained by analyzing the peak current (i) dependence on scan rate (v) (see FIGS. 21(*a*) and 21(*b*)). For a redox reaction limited by semi-infinite diffusion, the peak current is proportional to the square root of the scan rate ($v^{1/2}$); while for a capacitive process it varies linearly with v. A b value can be obtained by analyzing the power law relationship between i and v: $i=av^b$ where a and b are adjustable parameters. It was found that the b values for RS—$Nb_2O_5$ and a-$Nb_2O_5$ sample were ~0.85 and ~0.80, respectively.

The results suggest both electrodes have mixed contribution from diffusion and capacitive process with RS—$Nb_2O_5$ electrode having a slightly higher capacitive contribution indicative of a faster kinetic in RS—$Nb_2O_5$. The studies provide further evidence of the enhanced kinetics of the new cubic phase compared to its amorphous counterpart through improved ion mobility. These exceptional properties of RS—$Nb_2O_5$ facilitate high power performance.

Electrical Properties of RS—$Nb_2O_5$

Figure 22:
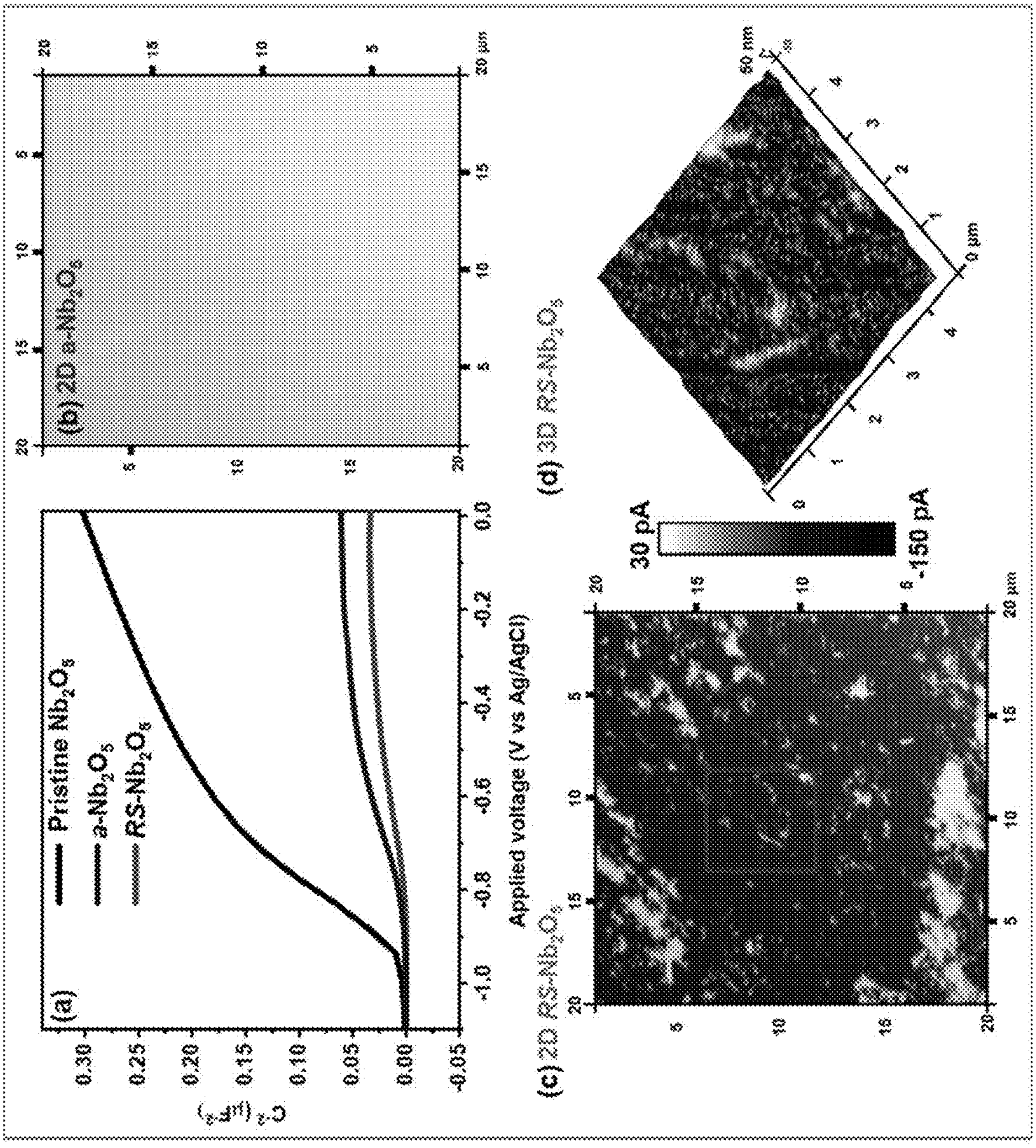
FIG. 22 shows characterization of the electrical conductivity of RS—$Nb_2O_5$ and a-$Nb_2O_5$ samples in accordance with disclosed embodiments.

Intercalation electrode materials are mixed ionic and electronic conductors. The electrical conductivity of the materials has a significant impact on their power performance. Therefore, the electrical conductivity of RS—$Nb_2O_5$ was evaluated through Mott-Schottky (M-S) analysis, 2-point probe conductivity measurement as well as PF-TUNA for comparison to a-$Nb_2O_5$ (see FIG. 22 and Table II). FIG. 22(*a*) shows Mott-Schottky analysis for pristine, a-, and RS—$Nb_2O_5$ samples. The RS—$Nb_2O_5$ had the highest concentration of charge carriers. In addition, it showed the lowest flat-band potential, suggesting that it requires the lowest potential to reach an equivalent electron density in the bulk and interface, and thus is more conductive than its counterparts. FIG. 22(*b*)-(*c*) show PF-TUNA images of the peak current map for the cycled a- and RS—$Nb_2O_5$ samples, respectively. The observed average current of RS—$Nb_2O_5$ sample was two orders of magnitude higher than that of a-$Nb_2O_5$ sample. FIG. 22(*d*) shows the overlay of a PF-TUNA current map on topography of the RS—$Nb_2O_5$ electrode.

TABLE II

Charge carrier density, flat-band potential, and electrical conductivity of nanochanneled $Nb_2O_5$ electrodes.

| | Carrier Density ($N/cm^{-3}$) | Flat-Band Potential (V) | Electrical Conductivity ($S\ cm^{-1}$) |
|---|---|---|---|
| Pristine | $3.31 \times 10^{18}$ | −0.9368 | $9.47 \times 10^{-10}$ |
| Amorphous | $1.44 \times 10^{19}$ | −0.7541 | $5.48 \times 10^{-7}$ |
| Rock Salt | $3.24 \times 10^{19}$ | −0.7265 | $1.80 \times 10^{-5}$ |

Figure 23:
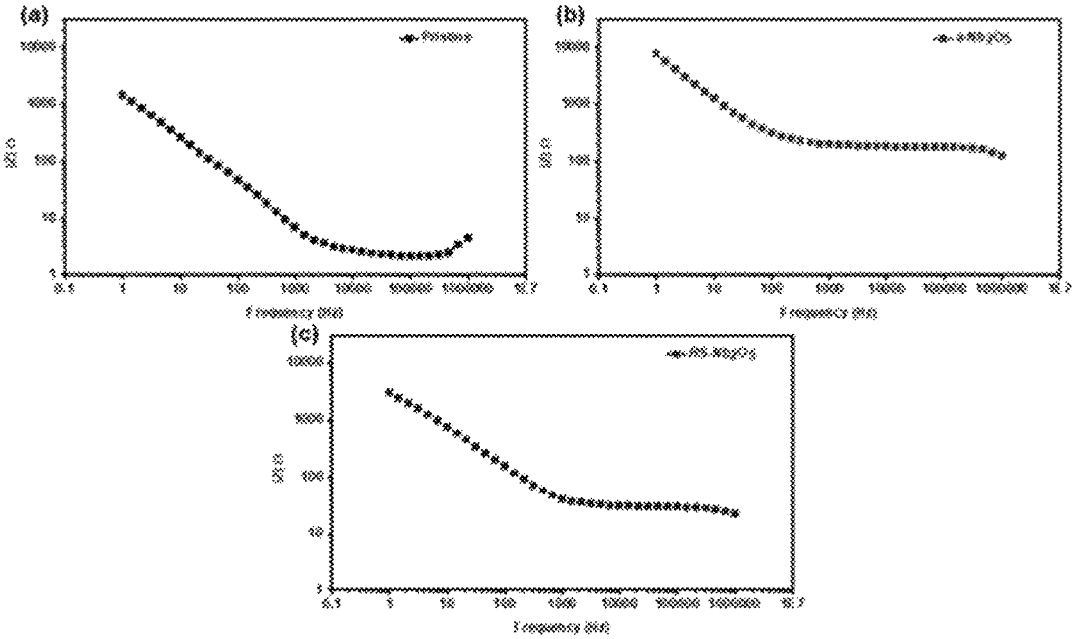
FIG. 23 shows Mott-Schottky analysis for pristine, a-, and RS—$Nb_2O_5$ samples in accordance with disclosed embodiments.

Mott-Schottky (M analysis (see FIG. 23) was carried out for pristine (FIG. 23(*a*)), a-(FIG. 23(*b*)), and RS—$Nb_2O_5$ (FIG. 23(*c*)) samples (see, also, FIG. 22(*a*)). The positive slope in FIG. 22(*a*) for each sample is indicative of an n-type semiconductor response where electrons are the major charge carriers, as expected for $Nb_2O_5$. The more depressed the slope in the M-S curves, the higher the concentration of carriers accordingly. As shown in Table II above, RS—$Nb_2O_5$ exhibited the highest charge carrier concentration.

Figure 24:
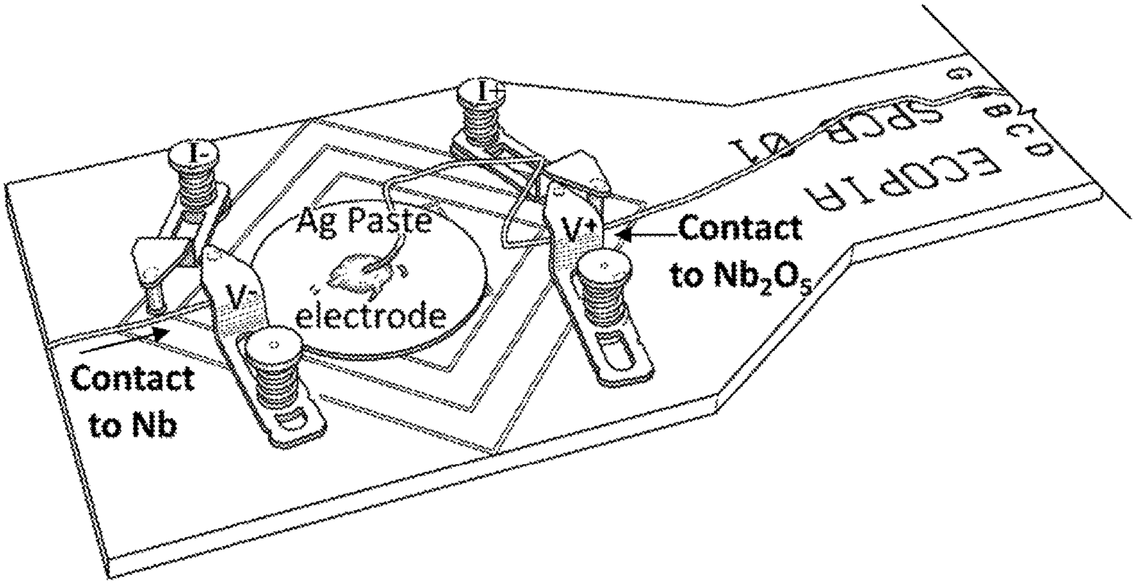
FIG. 24 shows a setup of two-point conductivity measurement of $Nb_2O_5$ on Nb substrate in accordance with disclosed embodiments.

Besides the M-S measurements, a two-point probe measurement (see FIG. 24, Table II) was carried out to determine the overall electrical conductivity of the samples. As shown in FIG. 24, gold contacts (e.g., contact to Nb and contact to $Nb_2O_5$ in FIG. 24) are connected to the front and back of the electrode using silver paste with a known area of contact. Two-point measurements allow us to obtain the conductivity through the nanochannels (out-of-plane conductivities). The electrical conductivity of RS—$Nb_2O_5$ is 33× higher than that of a cycled a-$Nb_2O_5$, and over 4 orders of magnitude higher than the pristine amorphous $Nb_2O_5$. Together with the M-S results, the increased electrical conductivity of RS—$Nb_2O_5$ indicates that both charge carrier concentration and electron mobility have increased in the new RS structure.

Figure 25:
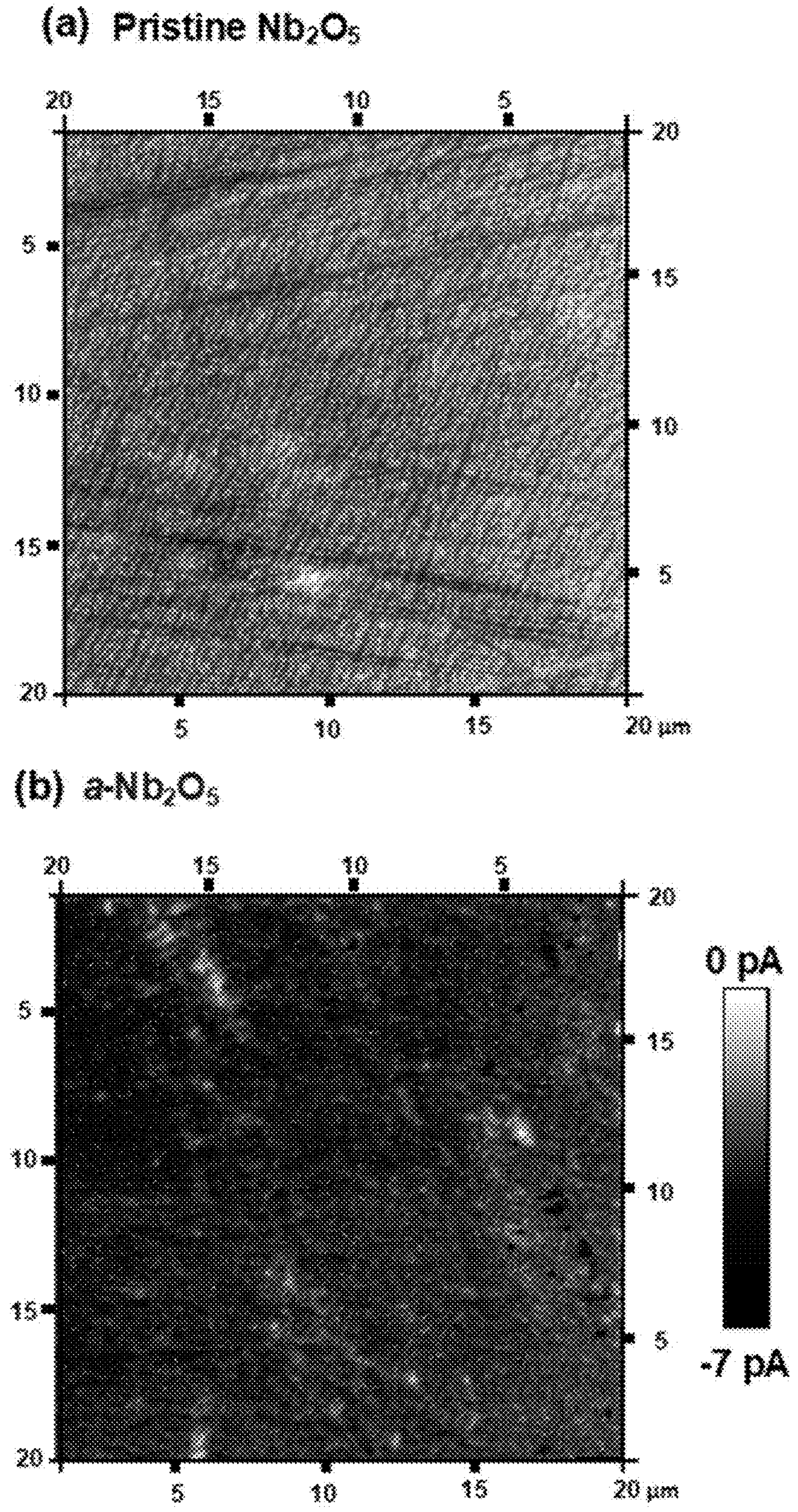
FIG. 25 shows PF-TUNA imaging of the electrical current of (a) pristine and (b) cycled a-$Nb_2O_5$ in accordance with disclosed embodiments.

PF-TUNA imaging was conducted on cycled a-$Nb_2O_5$ and RS—$Nb_2O_5$ samples (FIG. 22(*b*)-(*d*)) to simultaneously map the electrical conductivity and topography of each sample. PF-TUNA imaging of the pristine sample suggests negligible conductivity see FIG. 25(*a*)), indicating its insulating nature. While conductance in the cycled a-$Nb_2O_5$ sample (FIG. 22(*b*)) increased compared to the pristine sample, the observed average current of RS—$Nb_2O_5$ (FIG. 22(*c*)) was two orders of magnitude higher than that of a-$Nb_2O_5$. The 3D image in FIG. 22(*d*) features electrical current mapping overlaid on topography to provide direct visualization of the current distribution across the surface of RS—$Nb_2O_5$. The higher TUNA current in RS—$Nb_2O_5$ suggests that the a-to-c transformation has led to higher electrical conductivity, consistent with the results from the two-point probe measurements. The PF-TUNA imaging indicates that despite the greatly increased electrical conductivity of the RS—$Nb_2O_5$ electrode relative to the a-$Nb_2O_5$, the surface was still heterogeneous at the nanoscale. Within the 5×5 μm2 region shown in FIG. 22(*d*), uneven current distribution was observed over the surface. The observed heterogeneity is likely associated with the phase transformation process, which self-adapts to promote the lowest migration barriers for both ion and electron transport.

Rock Salt Formation of Various Ceramic Materials

Figure 26:
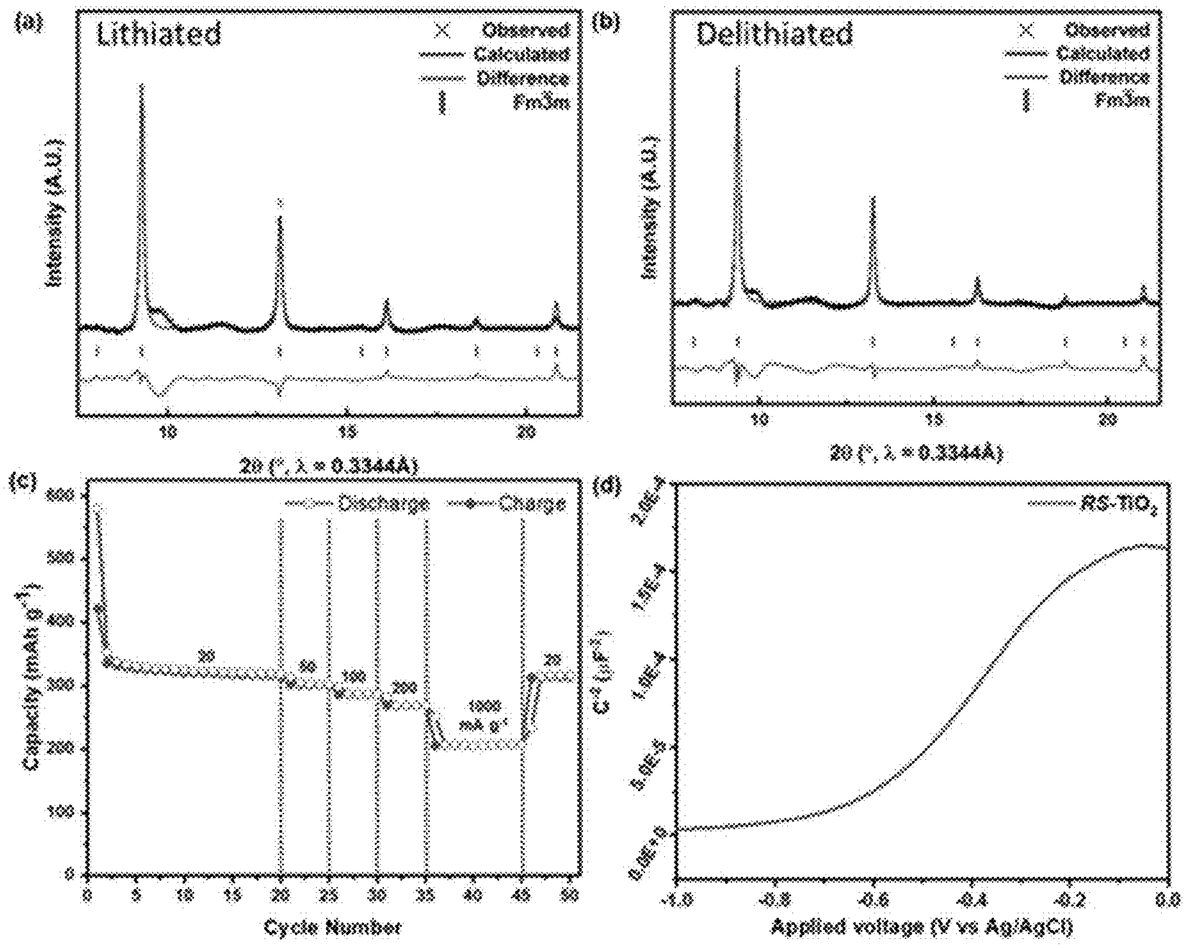
FIG. 26 shows a-to-c phase transformation in $TiO_2$ nanotube ($TiO_2$NT) electrode with electrochemical performance and Mott-Schottky analysis of RS—$TiO_2$ in accordance with disclosed embodiments.

Previously, some of the present inventors have discovered an a-to-c transformation in $TiO_2$ nanotube electrode during electrochemical lithiation. The structure of the crystalline $TiO_2$ was resolved through Rietveld refinement as a rock-salt phase (Fm3m) instead of the initial assignment of a spinel phase (Fd3m) (see FIG. 26(*a*)-(*b*) and Table III below). FIG. 26 shows Rietveld refinements of the sXRD patterns of lithiated $TiO_2NT$ (FIG. 26(*a*)) and delithiated $TiO_2NT$ (FIG. 26(*b*)) after electrochemical cycling with Lit FIG. 26(*c*) shows a rate capability of RS—$TiO_2$ electrode at different current rates of 20, 50, 100, 200, and 1000 mA $g^{-1}$. FIG. 26(*d*) shows Mott-Schottky analysis of the RS—$TiO_2$ sample.

TABLE III

XRD Rietveld refinement profile parameters.

| Sample | α (Å) | Scherrer Domain (nm) | Reduced $\chi^2$ | $R_{wp}$ (%) | GOF |
|---|---|---|---|---|---|
| Delithiated $TiO_2$ | 4.0974(8) | 19.9 | 0.19 | 2.506 | 0.43 |
| Lithiated $TiO_2$ | 4.1349(2) | 17.6 | 0.32 | 3.536 | 0.56 |

| Atom | x | Y | z | Occupancy | $U_{iso}$ |
|---|---|---|---|---|---|
| Space group: Fm-3m Delithiated $TiO_2$ | | | | | |
| $Ti^{4+}$ | 0 | 0 | 0 | 0.4447 | 0.02500 |
| $O^{2-}$ | ½ | ½ | ½ | 1 | 0.01490 |
| Lithiated $TiO_2$ | | | | | |
| $Ti^{4+}$ | 0 | 0 | 0 | 0.2700 | 0.00808 |
| $Li^{+}$ | 0 | 0 | 0 | 0.2300 | 0.001 |
| $O^{2-}$ | ½ | ½ | ½ | 1 | 0.02416 |

The RS—$TiO_2$ exhibited superior rate performance (see FIG. 26(*c*)). M-S analysis of RS—$TiO_2$ showed that the electrode has three orders of magnitude higher charge carrier concentration (8.76×1021 N/cm-3) than that (2.01×1019 N/cm-3) of a typical anatase $TiO_2$. Based on our studies in both $Nb_2O_5$ and $TiO_2$ systems along with recent works in other metal oxide systems, electrochemically-driven crystallization in metal oxide electrodes may provide a generalizable concept in materials synthesis for electrode materials with high capacity, power and cycling stability. It is believed, however, important to overcome the nucleation barriers for new rock-salt phase by manipulating the over-potential for the transformation during electrochemical cycling (e.g., lithiation below 1.1 V for the a-to-c transformation in $Nb_2O_5$).

Figure 27:
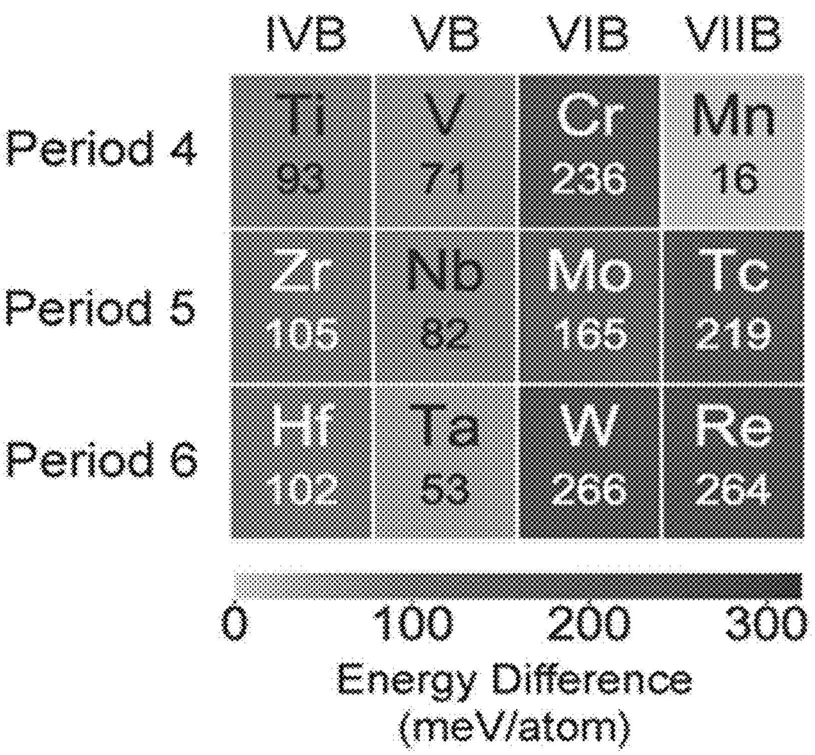
FIG. 27 shows relative thermodynamic stability of hypothetical rock-salt phases of 12 transition metal oxides in accordance with disclosed embodiments.

The energy difference between the rock-salt structure and the ground state structure for other transition metal oxides was evaluated (FIG. 27) as a metric for the likelihood for rock-salt formation. With reference to FIG. 27, it should be noted that $TiO_2$, $V_2O_5$ and $Nb_2O_5$, which have all been demonstrated to form DRXs during electrochemical cycling, have low calculated energy differences. In general, the group VIII and VIIB transition metal oxides are less stable (larger energy differences) than group IVB and group VB transition metal oxides, with the exception of Mn. In particular, $Ta_2O_5$ is another excellent DRX formation in accordance with disclosed embodiments.

Methods

Electropolishing of Nb Metal

The nanochanneled niobium oxide (NCNO) samples were prepared as follows. In short, Nb foil of 127 μm thickness (35×40 $mm^2$, Alfa Aesar, 99.8% annealed) was cut, sonicated sequentially in acetone, isopropanol, and deionized water for 5 minutes each, and electropolished in 2M sulfuric acid (Fisher Scientific, 95-98%) in methanol (Fisher Scientific, 99.9%) solution. Electropolishing was conducted at 15 V with a Pt mesh counter electrode at −70° C. for 2 hours.

Nanochannel $Nb_2O_5$ Synthesis

NCNOs were prepared by electrochemical anodization of Nb metal using a 10 wt % $K_2HPO_4$ in glycerol solution at 180° C., the Nb film was anodized at 25 V from 5 minutes up to 15 minutes. The as—anodized samples were then ultrasonically cleaned in DI water for 2 minutes. NCNO samples were then placed under vacuum and dried overnight at 110° C. The NCNO electrode contains a high density of channels ($4\times10^{14}$ pores $m^{-2}$), resulting in a surface area of 60-80 $m^2$ $g^{-1}$ (via SEM image analysis). This agrees with results from anodized aluminum oxides with similar pore structures.

$TiO_2$ Nanotube Synthesis

Ti foil (Alfa Aesar, 32 μm thick) was cut into 4×4.5 cm pieces and sonicated in acetone, isopropanol, and DI water for 5 minutes each. The prepared foil was then anodized in a solution of 0.27 M $NH_4F$ in formamide (Fisher Scientific), with Pt mesh as the counter electrode, for 30 minutes at 15 V. The as—anodized samples were then ultrasonically cleaned in nanopure water. Samples were dried overnight in a vacuum oven at 110° C.

Structural Characterizations

Grazing incidence synchrotron X-ray diffraction (sXRD) measurements were conducted at Sector 12-ID-D, Advanced Photon Source (APS) at Argonne National Laboratory. The X-ray wavelengths of both λ=0.684994 Å and 0.61990 Å were used in this study. For varying the structural probing depths, a series of incidence angles (α) from 0° up to 1° were adopted in the grazing incidence sXRD measurements. In order to minimize the scattering contribution from the bulk Nb foil substrate, we placed the sample on top of a convex shaped Teflon support for the measurements where the tail of the incident X-ray beam sweeps through the surface layer of the electrode samples. Additional in-house XRD measurements were taken with a Rigaku Miniflex diffractometer with Cu Kα irradiation at λ=1.5406 Å. XPS samples were loaded without air exposure through an Ar glove box connected directly to the UHV system. XPS measurements were performed using a Specs PHOIBOS 150 hemispherical energy analyzer with a monochromated Al Kα X-ray source. Survey and core level spectra were collected using a pass energy of 40 and 20 eV, respectively, and all spectra were referenced to the binding energy of $sp^3$-hybridized carbon at 284.8 eV. X-ray absorption spectroscopy (XAS) at beamline 12-BM-B in Argonne National Laboratory was used to determine the chemical environment of the materials. Samples for XAS were prepared with free-standing NCNO films peeled off from an Nb substrate. The films were placed onto a copper current collector and cycled in a Li half-cell. Scanning electron microscopy (SEM) images were taken with a FEI Teneo field emission SEM. SEM images were analyzed using the National Institutes of Health ImageJ V1.8 to determine pore size, size distribution, and surface area of the oxides. TEM, HRTEM, and SAED characterization of the samples were completed on a JEOL JEM-2100 at an acceleration voltage of 200 kV. TEM characterization were also completed on a JEOL JEM2100F microscope with a working voltage of 200 kV. A Zeiss NVision 40 was employed to prepared a TEM specimen (RS—$Nb_2O_5$ electrode after 100 cycles). By following the standard FIB lift-out procedure, the lamella was transferred to a TEM grid. A 30 kV Ga beam was employed for general milling. The final lamella was showered by a 5 kV Ga beam to reduce the ion beam damage from the 30 kV Ga beam.

Inductively coupled plasma mass spectrometry was conducted on a Thermo Fisher iCAP RQ ICP-MS coupled to a Teledyne Analyte Excite+ 193 nm laser ablation (LA) system. Each sample measurement is an average of three replicate analyses, consisting of a gas blank subtracted ablation peak, both of which are the average of 100 sweeps over 5 secs. Elemental concentrations are standardized against standard glasses (GSD and GSE*), except P, Ge and Se, which were standardized against sequential dilutions of single element ICPMS standards. Concentrations are reported in the form of grams of analyte per gram sample× 100 (wt %) assuming a sample volume for samples and standards. No detection (ND) indicates samples which had reading below the limit of detection, which is defined as 3X the background measured before each ablation pass. GSE measured at the largest possible spot size to compare accuracy at count rates comparable to that of the unknowns. Accepted values are from GeoREM preferred values (mean of new analyses).

ToF-SIMS measurement was performed at Environmental Molecular Sciences Laboratory (EMSL), which is located at Pacific Northwest National Laboratory. A TOF.SIMS5 instrument (IONTOF GmbH, Münster, Germany) was used. Dual beam depth profiling was used. A 2.0 keV $Cs^+$ beam was used as the sputtering beam and a 25 keV $Bi^+$ beam used as the analysis beam for signal collection. The $Cs^+$ sputtering beam (~65 nA) was scanned over a 200*200 $\mu m^2$ area, and the equivalent sputter rate ($SiO_2$ as a reference) was about 0.75 nm/s. The $Bi^+$ beam was focused to be about 5 μm diameter with a beam current was about 0.70 pA with a 10 kHz frequency. The $Bi^+$ beam was scanned over an area of 70*70 $\mu m^2$ at the $Cs^+$ sputter crater center. A low energy (10 eV) electron flood gun was used for charge compensation in all measurement.

Electrochemical Characterizations

Figure 28:
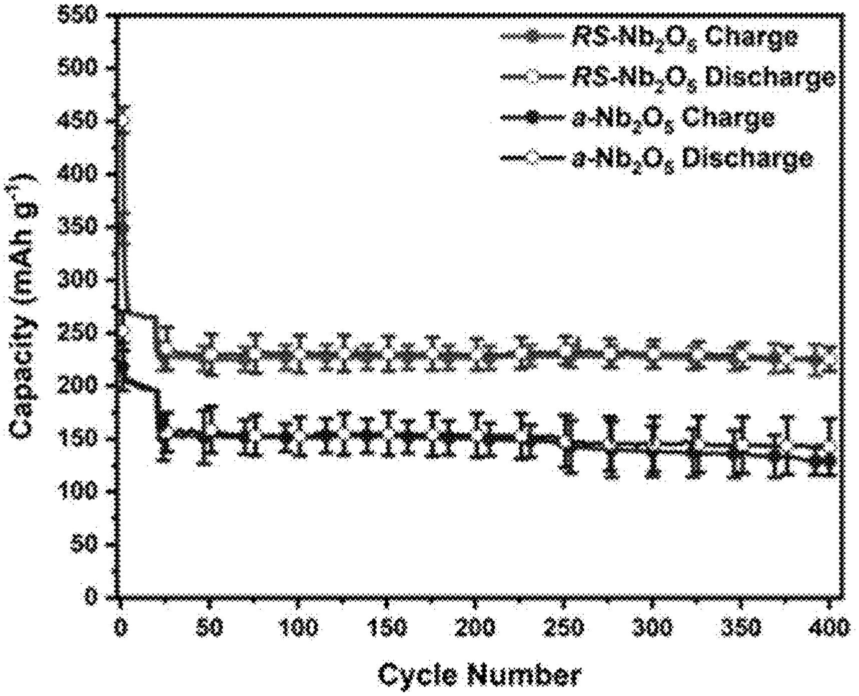
FIG. 28 shows cycle life of RS—$Nb_2O_5$ electrodes and a-$Nb_2O_5$ electrodes with standard deviations in accordance with disclosed embodiments.

Working electrodes were cut into 15 mm diameter disks using a disk cutter EQ-T06-Disc (MTI, Co). All batteries were prepared in an argon-filled glove box (MBraun) where oxygen levels were maintained below 0.5 ppm. Electrodes removed from cells for analysis were thoroughly washed with dry dimethyl carbonate (Aldrich) and allowed to dry under the inert atmosphere. Li half-cells were assembled in coin-type cells (Hohsen 2032) with Li metal foil (FMC) as the counter electrode, microporous polyolefin separators (Celgard 2325), and 1.2 M $LiPF_6$ in ethylene carbonate/ethyl methyl carbonate (3:7 weight ratio) electrolyte (Gen II, Tomiyama). Half-cells were cycled galvanostatically between 3 and 0.5 V vs Li/Li' using an automated Maccor battery tester at 25° C. Four cells were electrochemically tested to confirm reproducibility (see FIG. 28). A three-electrode cell ECC-ref (EL-Cell®) was used for the galvanostatic intermittent titration technique (GITT) measurements. The cell was made with Li metals as both the reference electrode and the counter electrode, glassy fiber separators (Whatman 2325), and Gen II electrolyte. The current was applied at 60 μA for 30 min, which was followed by a 12 hr relaxation to approach the steady state where the voltage variation is <2 mV Mass of the $Nb_2O_5$ films was determined by dissolution of the oxide film in 1% HF in concentrated HCl solution and measuring the weight difference of the samples before and after etching. This solution allows selective etching of $Nb_2O_5$ over Nb. The remaining substrate was examined by SEM and energy-dispersive X-ray spectroscopy (EDS) at 5 kV using an FEI Teneo FE-SEM to ensure that no residual $Nb_2O_5$ was left on the substrate. The mass loading of the electrodes was determined to be ~1.06±0.25 mg cm'.

Two-point Probe Measurements, Mott-Schottky Analysis, and PF-TUNA Measurements

Two-point electrical conductivity measurements and PeakForce tunneling atomic force microscopy (PF-TUNA) were used to determine the out-of-plane (i.e., through sample) conductivity of NCNO. For the two-point probe measurements, a silver paint contact was placed on the surface of the oxide film with another point of contact to the Nb foil. The contacts were then connected to the measurement device setup with Au wires. A current ranging from 0.2-20 μA was applied by a Keithley 237 High Voltage Source Measurement Unit and the resulting voltage was recorded by a Keithley 2000 Multimeter.

Mott-Schottky analysis was performed using the SPEIS program on a Bio-Logic VMP-240 in a three-electrode cell (EL-Cell®). Kapton tape was utilized as a mask leaving a disk electrode of 12.7 mm diameter for niobium oxide sample. A Pt mesh counter electrode and an Ag/AgCl reference electrode were used in an aqueous 1 M NaOH solution for $Nb_2O_5$ samples or 1 M KOH for $TiO_2$ samples. The charge carrier concentration of the samples was determined by the space charge capacitance ($C_{sc}$)[52] obtained from the imaginary part of the impedance Z":

$$C_{sc} = -\frac{1}{2\pi f Z''} \quad \text{Equation 1}$$

where f is the frequency. Bode plots in the frequency range of 100 mHz-100 kHz with a voltage amplitude of 10 mV from 0.1 to −1 V vs. Ag/AgCl in 0.05 V increments were collected to determine the frequency at which |Z| is constant for all samples and is suitable for Mott-Schottky analysis as seen in FIG. 23.

The |Z| plateaus at a frequency of about 1 kHz; therefore, the curves at 1.486 kHz were used to calculate the charge carrier density for each sample. The flat-band potential can also be obtained from the Mott-Schottky plots by finding the x-intercept of the tangent line to the linear region of each curve. The following equation relates the charge carrier density to the capacitance of the sample, where q is the charge of an electron, ε is the dielectric constant (assumed to be a constant value of 42), $\varepsilon_0$ is the vacuum permittivity constant, ND is the charge carrier density, A is the geometric surface area, $V_{fb}$ is the flat-band potential, V is the applied potential, k is Boltzmann's constant, and T is the absolute temperature in Kelvin.

$$C_{sc}^{-2} = \left(\frac{2}{q\epsilon\epsilon_0 N_D A^2}\right)\left(V - V_{fb} - \frac{kT}{q}\right) \quad \text{Equation 2}$$

Eqn 2 is then differentiated with respect to the voltage to obtain the charge carrier density as shown below.

$$N_D = \frac{2}{q\epsilon\epsilon_0 A^2}\left(\frac{dC^{-2}}{dy}\right)^{-1} \quad \text{Equation 3}$$

Ex situ PF-TUNA was performed using a Bruker Dimension Icon atomic force microscope (AFM) in an Ar-filled MBraun glovebox with <0.1 ppm water and oxygen. PF-TUNA provides spatially resolved nanoscale through-sample conductivity maps of resistive materials in response to an applied bias. A Bruker DDESP conductive diamond tip probe (100 nm nominal radius of curvature tip composed of 0.01-0.025 Ω∩cm antimony (n)-doped Si) with a setpoint force of 70 nN was used to simultaneously image the electrode topography and conductivity. The electrodes were placed directly onto the metallic vacuum chuck, and a bias voltage of −10 V was applied to the chuck (i.e., bottom surface of the electrode). 20×20 $\mu m^2$ images with 1024×1024 pixels were obtained to yield ~20 nm lateral resolution maps at a TUNA gain sensitivity of 20 pA/V (±10 V full scale, corresponding to ±200 pA sensitivity). Images were processed and analyzed in Nanoscope Analysis version 1.90. A first order plane fit was applied to the raw topographical data to account for sample tip and tilt, with an additional first-order flatten applied to correct for small line-to-line offsets in the Z piezo. A conductivity skin was then overlaid on the 3D topography image to visualize variations in current density via color contrast.

DFT Calculations

All DFT calculations were carried out using the Vienna ab initio simulation package (VASP) within the projector augmented wave approach. The Perdew-Burke-Ernzerhof (PBE) generalized gradient approximation (GGA) was adopted for the exchange-correlation functional. The kinetic energy cutoff was set to 520 eV and a k-point density of at least 1000 per reciprocal atom was used for structural relaxations of $Nb_2O_5$. The electronic energy and atomic forces were converged to within $10^{-5}$ eV and 0.02 eV/Å, respectively, in line with the settings in the Materials Project database.

Structure Enumeration

First, we enumerated and calculated the energies of all orderings in a $\sqrt{5}\times\sqrt{5}\times2$ supercell of cubic rock-salt $Li_3Nb_2O_5$. The Li and Nb occupancy of the octahedral sites (Wyckoff symbol: 4b) was set at x Li: 0.4 Nb, where x ranges from 0 to 0.6 at the interval of 0.1. 0.6 and 0.4, respectively, at the octahedral interstitial sites in a fcc oxygen lattice. Lithium was then removed in 0.5 increments from $Li_3Nb_2O_5$ and the symmetrically distinct orderings were then calculated for each composition. All symmetrically distinct orderings were generated with an enumeration algorithm interfaced with the Python Materials Geomics (pymatgen) library. These orderings were then fully relaxed using DFT calculations and the lowest energy configurations were used for subsequent analysis.

Intercalation Voltage Profile

The pseudo-binary stability diagrams for $Li_xNb_2O_5$ ($0\le x\le 3$) were constructed from previous structure enumeration and DFT relaxations. The stable intermediate phases in the stability diagram were used for static calculations with a denser Γ-centered k-mesh of 9×8×7 to obtain more accurate energies. The voltage profile was then obtained by computing the average voltage between any two stable intermediate phases: where E is the total DFT energy and e is the electronic charge.[59]

$$V = -\frac{E(Li_{x_1}Nb_2O_5) - E(Li_{x_2}Nb_2O_5) - (x_1 - x_2)E(Li)}{(x_1 - x_2)e} \quad \text{Equation 4}$$

Nudged Elastic Band Calculations

The migration barriers were calculated using climbing image nudged elastic band (CI-NEB) methods. The calculations were performed on $2\sqrt{5}\times2\sqrt{5}\times4$ supercells of the rock-salt primitive cell. These configurations were directly obtained by doubling each lattice vector of the low energy structures from previous voltage profile calculations. The number of images used for all CI-NEB calculations was 5. The energies and forces were converged to $5\times10^{-5}$ eV per supercell and 0.05 eV/A, respectively. It is expected that the neighboring atoms around the migration paths would have substantial effects on the barriers. In particular, there are 4 octahedral neighboring atoms sharing edges with the two octahedral migrating Li atoms and these neighboring atoms can be occupied by either Nb or Li. Herein, six representative low energy configurations were used as starting structures to construct the Li migration paths with x Li and (4–x) Nb occupying the edge-sharing neighboring atoms (see FIG. 15(*c*)). The barriers variation for each x are marginal, justifying the use of these representative configurations.

Although various embodiments have been shown and described, the present disclosure is not so limited and will be understood to include all such modifications and variations would be apparent to one skilled in the art.

What is claimed is:

1. An electrode material comprising:

a rock-salt transition metal oxide formed from an electrochemically-driven amorphous-to-crystalline (a-to-c) transformation of a nanostructured transition metal oxide, wherein the transition metal oxide is niobium pentoxide ($Nb_2O_5$) and the rock-salt transition metal oxide is rock-salt niobium pentoxide (RS—$Nb_2O_5$) and includes multi-electron redox per Nb for Li-ion ($Li^+$) storage.

2. The electrode material of claim 1 wherein the multi-electron redox per Nb for Li-ion ($Li^+$) storage further comprises three lithium ions ($Li^+$) per Nb.

3. The electrode material of claim 1 wherein the rock-salt niobium pentoxide (RS—$Nb_2O_5$) further comprises a cubic rock-salt phase with the space group of Fm3m.

4. The electrode material of claim 1 wherein the nanostructured transition metal oxide comprises an oxide of a group IVB or group VB transition metal.

5. The electrode material of claim 1 wherein the nanostructured transition metal oxide has an energy difference between the rock-salt structure and the ground state structure of less than 110 meV/atom.

* * * * *